(12) United States Patent
Lee

(10) Patent No.: US 9,480,080 B2
(45) Date of Patent: Oct. 25, 2016

(54) LONG TERM EVOLUTION BASE STATION AND WIRELESS RESOURCE SCHEDULING METHOD THEREOF

(71) Applicant: Institute For Information Industry, Taipei (TW)

(72) Inventor: Kun Hung Lee, Taipei (TW)

(73) Assignee: Institute For Information Industry, Taiwan (TW)

( * ) Notice: Subject to any disclaimer, the term of this patent is extended or adjusted under 35 U.S.C. 154(b) by 0 days.

(21) Appl. No.: 14/598,815

(22) Filed: Jan. 16, 2015

(65) Prior Publication Data

US 2016/0157263 A1 Jun. 2, 2016

(30) Foreign Application Priority Data

Dec. 1, 2014 (CN) .......................... 2014 1 0717385

(51) Int. Cl.
| | | |
|---|---|---|
| *H04W 72/00* | (2009.01) | |
| *H04W 72/12* | (2009.01) | |
| *H04W 4/00* | (2009.01) | |
| *H04W 72/04* | (2009.01) | |
| *H04W 88/08* | (2009.01) | |

(52) U.S. Cl.
CPC ......... *H04W 72/1257* (2013.01); *H04W 4/005* (2013.01); *H04W 72/12* (2013.01); *H04W 72/04* (2013.01); *H04W 88/08* (2013.01)

(58) Field of Classification Search
CPC ........... H04L 27/2662; H04L 27/2678; H04L 27/2688; H04L 1/20; H04L 1/248; H04L 1/16; H04L 7/00; H03M 2201/196; H03M 2201/3105; H03M 2201/1127; H03M 3/042; H04J 3/07; H04J 1/06; H04J 1/14; H04J 3/1688; H04W 72/042; H04W 72/0413; H04W 88/08; H04W 88/02; H04W 72/0406; H04W 72/0453; H04W 72/0446; H04W 72/082; H04W 24/10; H04W 72/12; H04W 72/044; H04W 36/30; H04W 72/1289; H04W 28/08; H04W 28/18
See application file for complete search history.

(56) References Cited

U.S. PATENT DOCUMENTS

| | | | | |
|---|---|---|---|---|
| 2009/0129326 | A1* | 5/2009 | Kim | .................. H04L 47/10 370/329 |
| 2009/0249153 | A1* | 10/2009 | Zhang | ................... H04L 1/1887 714/748 |
| 2009/0287976 | A1* | 11/2009 | Wang | ..................... H04L 1/1812 714/748 |
| 2013/0294399 | A1 | 11/2013 | Lee | |
| 2014/0349660 | A1 | 11/2014 | Abdalla | |

OTHER PUBLICATIONS

Office Action to the corresponding Taiwan Patent Application No. TW104100073 rendered by the Taiwan Intellectual Property Office (TIPO) on Feb. 23, 2016, 33 pages (including English translation).

* cited by examiner

Primary Examiner — Nimesh Patel
(74) Attorney, Agent, or Firm — Skaar Ulbrich Macari, P.A.

(57) ABSTRACT

An LTE base station and a wireless resource scheduling method thereof are provided. The LTE base station receives a transmission period, a tolerable time shift, a start transmission time instant, and a required resource amount from each of a plurality of machine type communication apparatuses. The LTE base station decides a scheduling interval length according to the transmission periods, decides a first scheduling interval according to a start scheduling time instant and the scheduling interval length, and decides a first resource allocation result of the first scheduling interval for the machine type communication apparatuses according to the transmission periods, the tolerable time shifts, the start transmission time instants, and the required resource amounts. The LTE base station further decides a second resource allocation result for the first scheduling interval or a second scheduling interval for the machine type communication apparatuses according to the first resource allocation result.

20 Claims, 14 Drawing Sheets

LONG TERM EVOLUTION BASE STATION AND WIRELESS RESOURCE SCHEDULING METHOD THEREOF

PRIORITY

This application claims priority to China Patent Application No. 201410717385.3 filed on Dec. 1, 2014, which is hereby incorporated by reference in its entirety.

FIELD

The present invention relates to a Long Term Evolution (LTE) base station and a wireless resource scheduling method thereof. More particularly, the present invention relates to an LTE base station and a wireless resource scheduling method thereof for scheduling a plurality of machine type communication (MTC) apparatuses.

BACKGROUND

With the rapid development of science and technologies, wireless network communication technologies have advanced to the generation of Long Term Evolution (LTE). According to the specifications of the LTE standard, an MTC apparatus (e.g., a smart electricity meter, various kinds of sensors, and etc.) with data that needs to be uploaded to an LTE base station must request a resource from the LTE base station via a contention-based random access procedure. When a large amount of MTC apparatuses in the LTE network have data to be uploaded to the LTE base station at the same time, the random access channel (RACH) in the control plane of the LTE network can become congested.

From the technical document No. TR 37.868 issued by the Third Generation Partnership Project (3GPP), for smart energy saving applications, one LTE base station serves more than 30,000 smart electricity meters in the suburban area of London on average. Furthermore, for taxi management applications, there are about 72 random access channel instructions per second around Beijing Capital International Airport. This means that each transmission request needs 36 preambles on average to be successfully accepted. By using conventional transmission mechanisms designed by the LTE standards for MTC apparatuses, the presence of numerous MTC apparatuses within the coverage of an LTE base station would cause a high collision probability, too many random access channel instructions, and a time delay.

Accordingly, there is still an urgent need for a wireless resource scheduling and transmission mechanism for MTC apparatuses conforming to the LTE standards.

SUMMARY

An objective of the present invention includes providing a Long Term Evolution (LTE) base station. The LTE base station in certain embodiments comprises a transceiver and a processor, wherein the transceiver and the processor are electrically connected with each other. The transceiver is wirelessly connected to a plurality of Machine Type Communication (MTC) apparatuses and configured to receive a transmission period, a tolerable time shift, a start transmission time instant, and a required resource amount from each of the MTC apparatuses. The processor decides a first scheduling interval length according to the transmission periods, decides a first scheduling interval according to a start scheduling time instant and the first scheduling interval length, decides a first resource allocation result of the first scheduling interval for the MTC apparatuses according to the transmission periods, the tolerable time shifts, the start transmission time instants, and the required resource amounts, and decides a second resource allocation result of one of the first scheduling interval and a second scheduling interval for the MTC apparatuses according to the first resource allocation result.

Another objective of the present invention includes providing a wireless resource scheduling method for use in an LTE base station. The LTE base station is wirelessly connected to a plurality of MTC apparatuses. The wireless resource scheduling method in certain embodiments comprises the following steps of: (a) receiving a transmission period, a tolerable time shift, a start transmission time instant, and a required resource amount from each of the MTC apparatuses, (b) deciding a first scheduling interval length according to the transmission periods, (c) deciding a first scheduling interval according to a start scheduling time instant and the first scheduling interval length, (d) deciding a first resource allocation result of the first scheduling interval for the MTC apparatuses according to the transmission periods, the tolerable time shifts, the start transmission time instants, and the required resource amounts, and (e) deciding a second resource allocation result of one of the first scheduling interval and a second scheduling interval for the MTC apparatuses according to the first resource allocation result.

For a plurality of MTC apparatuses served by an LTE base station, the present invention decides a first resource allocation result of the first scheduling interval for the MTC apparatuses in advance according to the transmission periods, the tolerable time shifts, the start transmission time instants, and the required resource amounts of the MTC apparatuses. Since the first resource allocation result may indicate that some MTC apparatuses are not allocated any resource, the present invention may further decide a second resource allocation result of one of the first scheduling interval and a second scheduling interval for the MTC apparatuses according to the first resource allocation result. Afterwards, the MTC apparatuses transmit data according to the first resource allocation result and/or the second resource allocation result. Since the present invention schedules the wireless resources for the MTC apparatuses in advance, it is unnecessary for the MTC apparatuses to request resources from the LTE base station via a contention-based random access procedure, thus overcoming the shortcomings of the prior art.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the LTE base station and the wireless resource scheduling method thereof according to the present invention will be explained with reference to example embodiments thereof. However, these example embodiments are not intended to limit the present invention to any specific examples, embodiments, environment, applications or particular implementations described in these embodiments. Therefore, the description of these example embodiments is only for purpose of illustration rather than to limit the present invention. It should be appreciated that elements unrelated to the present invention are omitted from depiction in the following embodiments and the attached drawings.

Figure 1A:
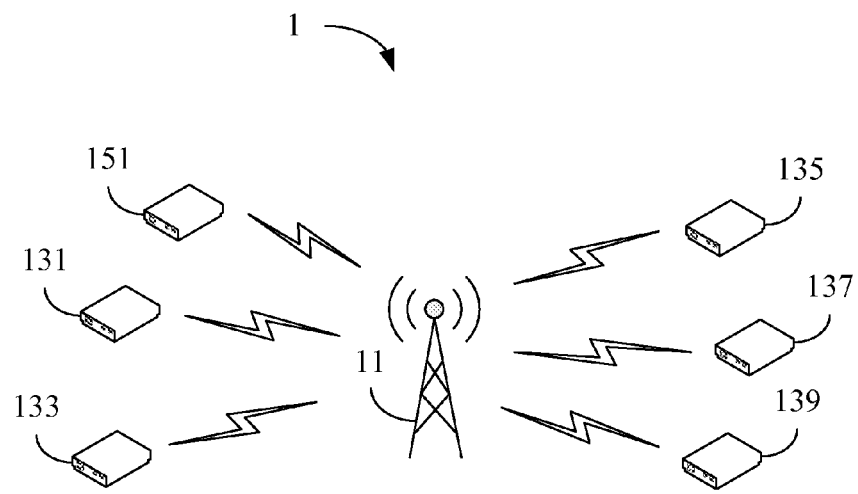
FIG. 1A depicts a schematic view of an LTE wireless network system of the present invention.
Figure 1B:
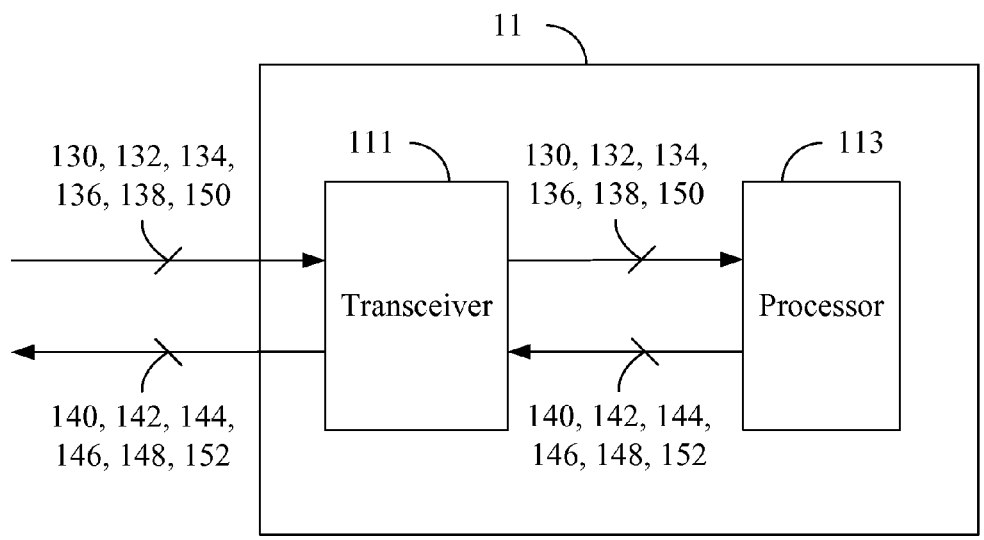
FIG. 1B depicts a schematic structural view of an LTE base station of the present invention.

A first embodiment of the present invention is an LTE wireless network system 1; a schematic view of which is depicted in FIG. 1A. The LTE wireless network system 1 comprises an LTE base station 11 and a plurality of MTC apparatuses 131, 133, 135, 137, 139, 151, wherein the MTC apparatuses 131, 133, 135, 137, 139, 151 are wirelessly connected to the LTE base station 11. It should be appreciated that the present invention has no limitation on the number of the MTC apparatuses that can be wirelessly connected to an LTE base station, although six MTC apparatuses 131, 133, 135, 137, 139, 151 are depicted in FIG. 1A. FIG. 1B depicts a schematic structural view of the LTE base station 11. The LTE base station 11 comprises a transceiver 111 and a processor 113, wherein the processor 113 is electrically connected to the transceiver 111. The transceiver 111 may be any interface that can wirelessly receive and transmit a signal/datum, while the processor 113 may be any processor, central processing unit (CPU), microprocessor, or other computing apparatus well known to people of ordinary skill in the art.

Figure 1C:
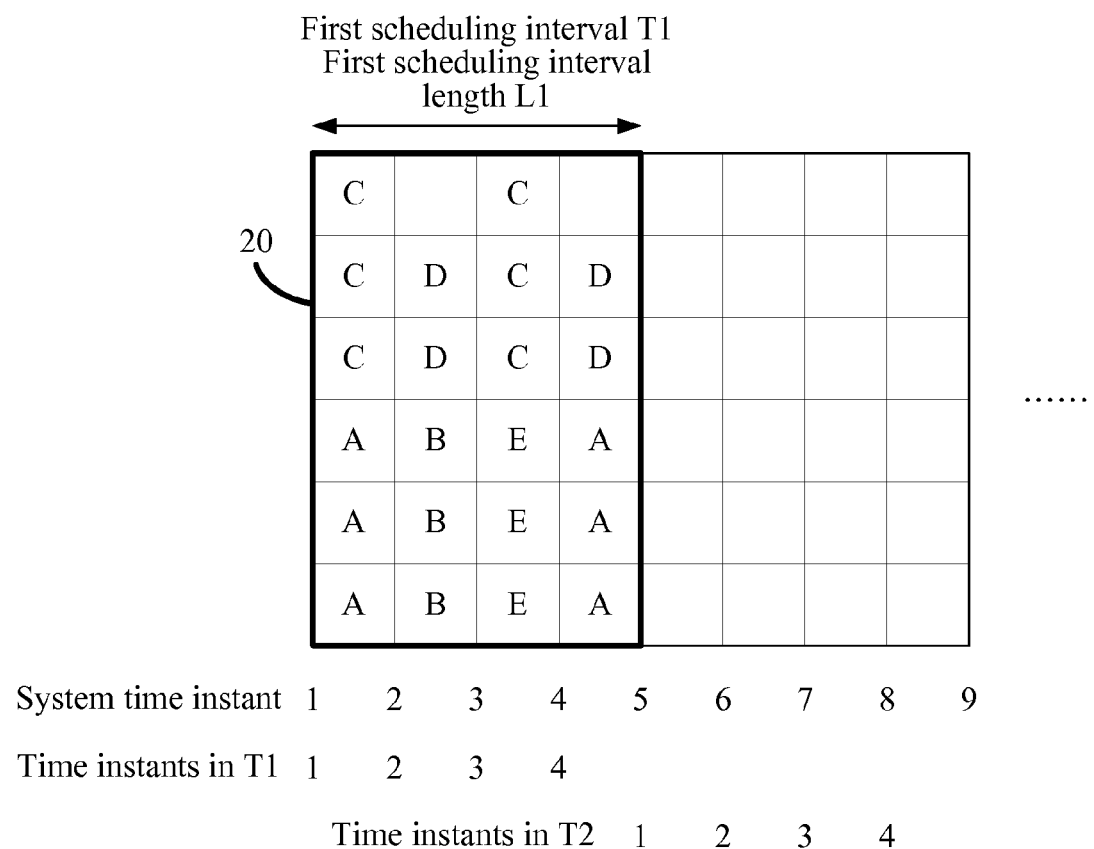
FIG. 1C depicts resources and a first resource allocation result provided by the LTE base station.

FIG. 1C depicts the resources provided by the LTE base station 11, where the horizontal axis represents time and each square represents a resource block. According to the content depicted in FIG. 1C, the LTE base station 11 provides six resource blocks at each time instant (e.g., the system time instants 1, 2, 3, 4, 5, 6, 7, 8). People of ordinary skill in the art shall understand that the form of the resources provided by the LTE base station 11 is not limited to the resource block and the number of the resources provided by the LTE base station 11 at each time instant is not limited to six.

The MTC apparatuses 131, 133, 135, 137, 139, 151 have to transmit data to the LTE base station 11 periodically and each transmission time instant is allowed to be shifted within a certain degree. In other words, each of the MTC apparatuses 131, 133, 135, 137, 139, 151 has a transmission period (not depicted) and a tolerable time shift (not depicted). Additionally, each of the MTC apparatuses 131, 133, 135, 137, 139, 151 also has a start transmission time instant (not depicted) and a required resource amount (not depicted). For example, for the MTC apparatus 131, the transmission period is three time units, the tolerable time shift is one time unit before and after a transmission time instant, the start transmission time instant is the system time instant 1, and the required resource amount is three resource blocks. For the MTC apparatus 133, the transmission period is three time units, the tolerable time shift is one time unit before and after a transmission time instant, the start transmission time instant is the system time instant 2, and the required resource amount is three resource blocks. For the MTC apparatus 135, the transmission period is two time units, the tolerable time shift is two time units before and after a transmission time instant, the start transmission time instant is the system time instant 1, and the required resource amount is three resource blocks. For the MTC apparatus 137, the transmission period is two time units, the tolerable time shift is two time units before and after a transmission time instant, the start transmission time instant is the system time instant 2, and the required resource amount is two resource blocks. For the MTC apparatus 139, the transmission period is four time units, the tolerable time shift is one time unit before and after a transmission time instant, the start transmission time instant is the system time instant 3, and the required resource amount is three resource blocks. For the MTC apparatus 151, the transmission period is two time units, the tolerable time shift is one time unit before and after a transmission time instant, the start transmission time instant is the system time instant 1, and the required resource amount is three resource blocks.

Each of the MTC apparatuses 131, 133, 135, 137, 139, 151 transmits the transmission period, the tolerable time shift, the start transmission time instant, and the required resource amount to the LTE base station 11. The transceiver 111 receives the transmission periods, the tolerable time shifts, the start transmission time instants, and the required resource amounts from the MTC apparatuses 131, 133, 135, 137, 139, 151. For example, the MTC apparatuses 131, 133, 135, 137, 139, 151 may transmit the signals 130, 132, 134, 136, 138, 150 to the LTE base station 11 respectively. The signal 130 comprises the transmission period, the tolerable time shift, the start transmission time instant, and the required resource amount of the MTC apparatus 131. The signal 132 comprises the transmission period, the tolerable time shift, the start transmission time instant, and the required resource amount of the MTC apparatus 133. The signal 134 comprises the transmission period, the tolerable time shift, the start transmission time instant, and the required resource amount of the MTC apparatus 135. The signal 136 comprises the transmission period, the tolerable time shift, the start transmission time instant, and the required resource amount of the MTC apparatus 137. The signal 138 comprises the transmission period, the tolerable time shift, the start transmission time instant, and the required resource amount of the MTC apparatus 139. The signal 150 comprises the transmission period, the tolerable time shift, the start transmission time instant, and the required resource amount of the MTC apparatus 151. The transceiver 111 receives the signals 130, 132, 134, 136, 138, 150 and transmits them to the processor 113 for further processing.

The processor 113 decides a first scheduling interval length L1 according to the transmission periods of the MTC apparatuses 131, 133, 135, 137, 139, 151. For example, in this embodiment, the processor 113 may decide that the first scheduling interval length L1 is equal to the greatest transmission period (i.e., four time units). As another example, in other embodiments, the processor 113 may decide that the first scheduling interval length L1 is equal to the least common multiple of the transmission periods. It shall be appreciated that this embodiment has no limitation on the specific value of the first scheduling interval length L1. It is noted that if the first scheduling interval length L1 is set to not be smaller than the greatest transmission period, each of the MTC apparatuses 131, 133, 135, 137, 139, 151 will be considered by the processor 113 when scheduling the wireless resources for each scheduling interval that is decided according to the first scheduling interval length L1.

Next, the processor 113 decides a first scheduling interval T1 (e.g., an interval from the initial system time instant 1 to a system time instant 5 of the LTE base station 11 depicted in FIG. 1C) according to a start scheduling time instant (e.g., the initial system time instant 1 of the LTE base station 11 depicted in FIG. 1C) and the first scheduling interval length L1 (i.e., four time units in this embodiment). The processor 113 further decides a first resource allocation result 20 of the first scheduling interval T1 for the MTC apparatuses 131, 133, 135, 137, 139, 151 according to the transmission periods, the tolerable time shifts, the start transmission time instants, and the required resource amounts. When deciding the first resource allocation result 20 for the MTC apparatuses 131, 133, 135, 137, 139, 151, the processor 113 may allocate the resources to the MTC apparatuses 131, 133, 135, 137, 139, 151 by following a processing order decided according to an ascending order of the start transmission time instants, the lengths of the transmission periods, the lengths of the tolerable time shifts, the amounts of the required resource amounts, and/or the priority levels arbitrarily assigned by the system. The first resource allocation result 20 comprises the transmission time instants that can be used by each of the MTC apparatuses 131, 133, 135, 137, 139, 151 within the first scheduling interval T1.

In some embodiments, for each of the MTC apparatuses 131, 133, 135, 137, 139, 151, the processor 113 temporarily decides at least one possible transmission time instant according to the start transmission time instant and the transmission period, decides a tolerable transmission interval according to the tolerable time shift, and selects a time instant that the required resource amount is available from the tolerable transmission interval as the transmission time instant. In some other embodiments, for each of the MTC apparatuses 131, 133, 135, 137, 139, 151, the processor 113 may temporarily decide at least one possible transmission time instant according to the start transmission time instant and the transmission period and determines whether the required resource amount is available at each of the at least one possible transmission time instant. For a possible transmission time instant that the required resource amount is available, that possible transmission time instant is the transmission time instant. For a possible transmission time instant that the required resource amount is not available, the processor 113 further decides a tolerable transmission interval according to the tolerable time shift and selects a time instant that the required resource amount is available from the tolerable transmission interval as the transmission time instant. No matter which manner is adopted, one or more of the MTC apparatuses 131, 133, 135, 137, 139, 151 may not be allocated any resource within the first scheduling interval T1 in some cases.

Now, a concrete example will be described with reference to FIG. 1C. The processor 113 temporarily decides that the possible transmission time instants of the MTC apparatus 131 are the time instant 1 and the time instant 4 (i.e., the system time instant 1 and the system time instant 4) within the first scheduling interval T1, determines that there are the required resource amount (e.g., the resource blocks A) of the MTC apparatus 131 is available at the possible transmission time instants, and then decides the time instant 1 and the time instant 4 within the first scheduling interval T1 are the transmission time instants of the MTC apparatus 131. Similarly, the processor 113 temporarily decides that the possible transmission time instant of the MTC apparatus 133 is the time instant 2 (i.e., the system time instant 2) within the first scheduling interval T1, determines that the required resource amount (e.g., the resource blocks B) of the MTC apparatus 133 is available at the possible transmission time instant, and then decides the time instant 2 within the first scheduling interval T1 is the transmission time instant of the MTC apparatus 133. The processor 113 temporarily decides that the possible transmission time instants of the MTC apparatus 135 are the time instant 1 and the time instant 3 (i.e., the system time instant 1 and the system time instant 3) within the first scheduling interval T1, determines that the required resource blocks (e.g., the resource blocks C) of the MTC apparatus 135 is available at the possible transmission time instants, and then decides the time instant 1 and the time instant 3 within the first scheduling interval T1 are the transmission time instants of the MTC apparatus 135. The processor 113 temporarily decides that the possible transmission time instants of the MTC apparatus 137 are the time instant 2 and the time instant 4 (i.e., the system time instant 2 and the system time instant 4) within the first scheduling interval T1, determines that the required resource amount (e.g., the resource blocks D) of the MTC apparatus 137 is available at the possible transmission time instants, and then decides the time instant 2 and the time instant 4 within the first scheduling interval T1 are the transmission time instants of the MTC apparatus 137. The processor 113 temporarily decides that the possible transmission time instant of the MTC apparatus 139 is the time instant 3 (i.e., the system time instant 3) within the first scheduling interval T1, determines that the required resource amount (e.g., the resource blocks E) of the MTC apparatus 139 is available at the possible transmission time instant, and then decides the time instant 3 within the first scheduling interval T1 is the transmission time instant of the MTC apparatus 139. Additionally, the processor 113 temporarily decides that the possible transmission time instants of the MTC apparatus 151 are the time instant 1 and the time instant 3 (i.e., the system time instant 1 and the system time instant 3) within the first scheduling interval T1, determines that the required resource amount of the MTC apparatus 151 is not available at the possible transmission time instants. As a result, the processor 113 decides a tolerable transmission interval (not depicted) within the first scheduling interval T1 for the MTC apparatus 151 according to the tolerable time shift (i.e., one time unit before and after each of the possible transmission time instants) of the MTC apparatus 151. The processor 113 determines that the required resource amount of the MTC apparatus 151 is also not available in the tolerable transmission interval of the MTC apparatus 151 within the first scheduling interval T1. Hence, the MTC apparatus 151 is temporarily not allocated any resource. FIG. 1C depicts the first resource allocation result 20 obtained after the processor 113 schedules the wireless resources as described above.

Figure 1D:
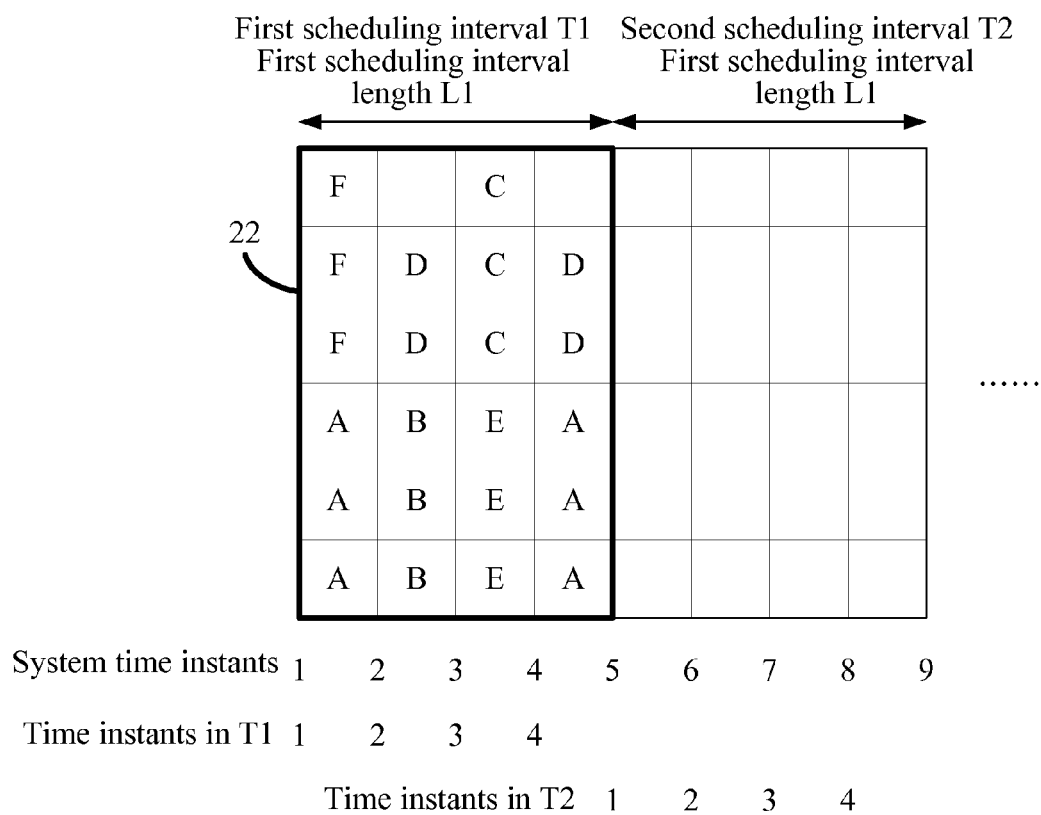
FIG. 1D depicts a second resource allocation result obtained after replacing the resources.

Since the MTC apparatus 151 is not allocated any resource within the first scheduling interval T1, the processor 113 further decides a second resource allocation result for the MTC apparatuses 131, 133, 135, 137, 139, 151 within the first scheduling interval T1 again according to the first resource allocation result 20. Specifically, the processor 113 determines that the first resource allocation result 20 of the first scheduling interval T1 indicates that the MTC apparatus 151 among the MTC apparatuses 131, 133, 135, 137, 139, 151 is not allocated any resource. Additionally, the processor 113 determines that the resources corresponding to the possible transmission time instants (i.e., the time instant 1 and the time instant 3 within the first scheduling interval T1) of the MTC apparatus 151 within the first scheduling interval T1 are allocated to the MTC apparatuses 131, 135, 139 and both the MTC apparatuses 131, 135 are allocated resources at least twice within the first scheduling interval T1. As a result, the processor 113 re-allocates the resources allocated to the MTC apparatus 131 at the time instant 1, the resources allocated to the MTC apparatus 135 at the time instant 1, or the resources allocated to the MTC apparatus 135 at the time instant 3 to the MTC apparatus 151. For example, the processor 113 may randomly select one of the aforementioned resources (e.g., the resource allocated to the MTC apparatus 135 at the time instant 1) and re-allocate that resource to the MTC apparatus 151. FIG. 1D depicts a second resource allocation result 22 obtained after re-allocating the resources in the aforesaid manner, wherein the resource block F represents the resources re-allocated to the MTC apparatus 151.

In some embodiments, the processor 113 may select an MTC apparatus whose allocated resources will be re-allocated to other(s) according to some preset rules. For example, the preset rule may be preferentially selecting an MTC apparatus with a lower time tolerance (e.g., the one with a shorter transmission period) and re-allocating the resource that is allocated thereto once to the MTC apparatus 151, which has not been allocated any resource. If this preset rule is adopted, the basic replacement logic is that this type of MTC apparatus has a higher transmission frequency and, hence, can tolerate the result of giving up data transmission one time. If this preset rule is adopted, the processor 113 re-allocates the resource allocated to the MTC apparatus 135 (which has a shorter transmission period than the MTC apparatus 131) once to the MTC apparatus 151, as shown in FIG. 1D.

Figure 1E:
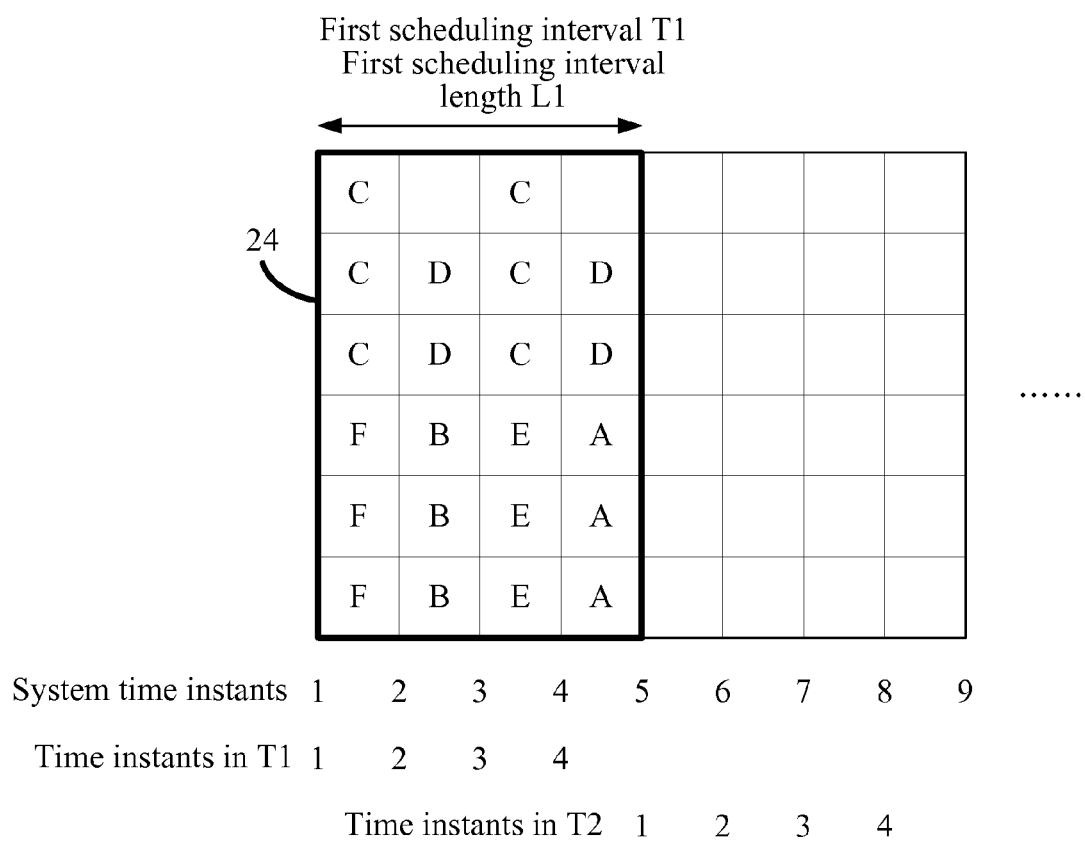
FIG. 1E depicts a second resource allocation result after re-allocation.

As another example, the preset rule may be preferentially selecting an MTC apparatus with a higher time tolerance (e.g., the one with a longer transmission period) and re-allocating the resource allocated thereto once to the MTC apparatus 151, which has not been allocated any resource. If this preset rule is adopted, the basic replacement logic thereof is that this type of MTC apparatus has a lower transmission frequency and a lower sensitivity, so it can be given a lower access priority level or its data transmission can be delayed. If this preset rule is adopted, the processor 113 re-allocates the resource allocated to the MTC apparatus 131 (which has a longer transmission period than the MTC apparatus 135) once to the MTC apparatus 151. FIG. 1E depicts a second resource allocation result 24 after the re-allocation as described above, wherein the resource block F represents the resource re-allocated to the MTC apparatus 151.

The second resource allocation result 22 (or the second resource allocation result 24) obtained after the resource replacement comprises at least one transmission time instant of each of the MTC apparatuses 131, 133, 135, 137, 139, 151 within the first scheduling interval T1. Then, the transceiver 111 transmits each of the at least one transmission time instant to the corresponding MTC apparatus. Specifically, if the second resource allocation result 22 is adopted, the transceiver 111 transmits a signal 140 comprising the time instant 1 and the time instant 4 within the first scheduling interval T1 to the MTC apparatus 131, transmits a signal 142 comprising the time instant 2 within the first scheduling interval T1 to the MTC apparatus 133, transmits a signal 144 comprising the time instant 3 within the first scheduling interval T1 to the MTC apparatus 135, transmits a signal 146 comprising the time instant 2 and the time instant 4 within the first scheduling interval T1 to the MTC apparatus 137, transmits a signal 148 comprising the time instant 3 within the first scheduling interval T1 to the MTC apparatus 139, and transmits a signal 152 comprising the time instant 1 within the first scheduling interval T1 to the MTC apparatus 131. After having received the signals 140, 142, 144, 146, 148, 152, the MTC apparatuses 131, 133, 135, 137, 139, 151 transmit data according to at least one transmission time instant comprised in the signals 140, 142, 144, 146, 148, 152 respectively.

It should be appreciated that if the first resource allocation result 20 obtained through scheduling the wireless resources by the processor 113 indicates that each of the MTC apparatuses 131, 133, 135, 137, 139, 151 is allocated resource within the first scheduling interval T1 (i.e., each of the MTC apparatuses 131, 133, 135, 137, 139, 151 has at least one transmission time instant within the first scheduling interval T1), it is unnecessary for the processor 113 to re-allocate some of the resources according to the first resource allocation result 20. Under this circumstance, the transceiver 111 transmits each of the at least one transmission time instant to the corresponding MTC apparatus respectively according to the first resource allocation result 20.

After having scheduled the wireless resources for the first scheduling interval T1, the processor 113 updates the start transmission time instants and the start scheduling time instants of the MTC apparatuses 131, 133, 135, 137, 139, 151. Specifically, the processor 113 updates the start transmission time instants of the MTC apparatuses 131, 133, 135, 137, 139, 151 as the system time instant 7, the system time instant 5, the system time instant 5, the system time instant 6, the system time instant 7, and the system time instant 5 respectively according to the transmission periods of the MTC apparatuses 131, 133, 135, 137, 139, 151. Additionally, the processor 113 takes the end-up scheduling time instant of the first scheduling interval T1 as a next start scheduling time instant (i.e., the system time instant 5 depicted in FIG. 1D).

The processor 113 determines that no MTC apparatus moves into or out of the LTE wireless network system 1 within the scheduling interval T1 (i.e., all the MTC apparatuses 131, 133, 135, 137, 139, 151 are still wirelessly connected to the LTE base station and no other MTC apparatus starts to be wirelessly connected to the LTE base station within the first scheduling interval T1). Based on this determination result, the processor 113 decides a second scheduling interval T2 (e.g., an interval from the system time instant 5 to the system time instant 9 depicted in FIG. 1D) according to the updated start scheduling time instant (i.e., the system time instant 5 depicted in FIG. 1D) and the first scheduling interval length L1 (which is still four time units).

Next, the processor 113 allocates the wireless resources for the second scheduling interval T2. Briefly speaking, the processor 113 decides a resource allocation result (not depicted) of the second scheduling interval T2 for the MTC apparatuses 131, 133, 135, 137, 139, 151 according to the transmission periods, the tolerable time shifts, the updated start transmission time instants (i.e., the system time instant 7, the system time instant 5, the system time instant 5, the system time instant 6, the system time instant 7, and the time instant 5, which are equivalent to the time instant 3, the time instant 1, the time instant 1, the time instant 2, the time instant 3 and the time instant 1 within the second scheduling interval T2) and the required resource amounts of the MTC apparatuses 131, 133, 135, 137, 139, 151. If this resource allocation result indicates that a certain or some MTC apparatuses are not allocated any resource, the processor 113 further decides another resource allocation result of the second scheduling interval T2 for the MTC apparatuses 131, 133, 135, 137, 139, 151 through replacement according to the resource allocation result. According to the aforesaid descriptions for the first scheduling interval T1, people of ordinary skill in the art shall readily conceive how the processor 113 allocates the wireless resources for the second scheduling interval T2 Hence, the details are not repeated herein.

It should be appreciated that according to the technology provided by this embodiment, if any MTC apparatus moves into or out of the LTE wireless network system 1 (i.e., any of the MTC apparatuses 131, 133, 135, 137, 139, 151 stops the wireless connection with the LTE base station 11 or some other MTC apparatus starts to be wirelessly connected to the LTE base station) within any scheduling interval, then the processor 113 updates the first scheduling interval length L1 again according to the transmission periods of the MTC apparatuses currently wirelessly connected to the LTE wireless network system 1. Afterwards, the processor 113 further decides a next scheduling interval according to the start scheduling time instant and the updated first scheduling interval length L1, decides the resource allocation result of the next scheduling interval for each of the MTC apparatuses according to the transmission periods, the tolerable time shifts, the start transmission time instants, and the required resource amounts of the MTC apparatuses that are currently wirelessly connected to the LTE wireless network system 1, and determines whether there is a need to update the resource allocation result through replacement. It should be further appreciated that in other embodiments, if any MTC apparatus moves out of the LTE wireless network system 1 within any scheduling interval (i.e., any of the MTC apparatuses 131, 133, 135, 137, 139, 151 stops the wireless connection with the LTE base station 11), the processor 113 may not update the first scheduling interval length L1 and still use the resource arrangement results corresponding to the left MTC apparatuses in the first resource allocation result 20 in the next scheduling interval.

According to the above descriptions, for the MTC apparatuses 131, 133, 135, 137, 139, 151 served by the LTE base station 11, the LTE base station 11 schedules the wireless resources in advance to obtain a resource allocation result according to the transmission periods, the tolerable time shifts, the start transmission time instants, and the required resource amounts of the MTC apparatuses 131, 133, 135, 137, 139, 151. If this resource allocation result indicates that one or more MTC apparatuses are not allocated any resource, the LTE base station 11 updates the resource allocation result through replacement so that more MTC apparatuses are allocated resources (i.e., are allocated the transmission time instants). Since the LTE base station 11 decides the transmission time instants for the MTC apparatuses 131, 133, 135, 137, 139, 151 in advance, it is unnecessary for the MTC apparatuses 131, 133, 135, 137, 139, 151 to request resources from the LTE base station 11 via a contention-based random access procedure. Therefore, the shortcomings of the prior art are overcome.

Figure 2:
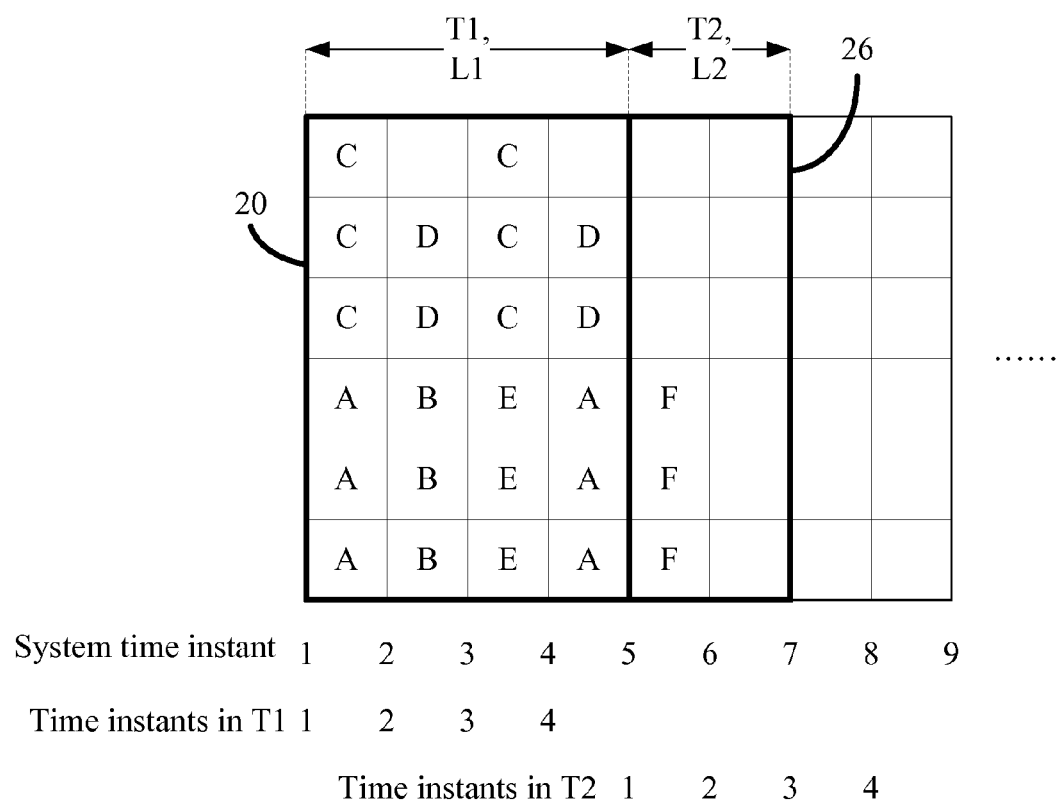
FIG. 2 depicts a resource allocation result of a second embodiment.

Please refer to FIGS. 1A-1C and FIG. 2 for a second embodiment of the present invention, wherein FIG. 2 depicts a resource allocation result of this embodiment. Most operations of the second embodiment are similar to those of the first embodiment. The differences between the two embodiments lie in the operations adopted by the LTE base station 11 when the first resource allocation result 20, which is the resource allocation result within the first scheduling interval T1 and is decided by the LTE base station 11 for the MTC apparatuses 131, 133, 135, 137, 139, 151, indicates that one or more MTC apparatuses are not allocated any resource. In the following descriptions, only the differences between this embodiment and the first embodiment will be detailed.

In this embodiment, the processor 113 determines that the first resource allocation result 20 indicates that the MTC apparatuses 131, 133, 135, 137, 139 included in a first part of the MTC apparatuses 131, 133, 135, 137, 139, 151 are all allocated resource and the MTC apparatus 151 included in a second part of the MTC apparatuses 131, 133, 135, 137, 139, 151 is not allocated any resource. Then, the processor 113 decides a second resource allocation result 26 in the next scheduling interval (i.e., the second scheduling interval T2) according to the first resource allocation result 20, as shown in FIG. 2.

Specifically, the processor 113 decides a second scheduling interval length L2 according to the transmission period (i.e., two time units) corresponding to the MTC apparatus 151 included in the second part. For example, in this embodiment, the processor 113 may decide that the second scheduling interval length L2 is equal to the greatest one (i.e., two time units) of the at least one transmission period corresponding to the at least one MTC apparatus included in the second part. As another example, in other embodiments, the processor 113 may decide that the second scheduling interval length L2 is equal to the least common multiple of the at least one transmission period corresponding to the at least one MTC apparatus included in the second part. This embodiment has no limitation on the specific value of the second scheduling interval length L2. It is noted that if the second scheduling interval length L2 is set to not be smaller than the greatest one of the at least one transmission period corresponding to the at least one MTC apparatus included in the second part, each of the MTC apparatuses included in the second part will be considered by the processor 113 when scheduling the wireless resources for each scheduling interval decided according to the second scheduling interval length L2.

Next, the processor 113 decides the next scheduling interval (i.e., the second scheduling interval T2) according to an end-up scheduling time instant (i.e., the system time instant 5) of the first scheduling interval T1 as shown in FIG. 2. Then, the processor 113 decides the second resource allocation result 26 in the second scheduling interval T2 for the MTC apparatus 151 included in the second part according to the at least one transmission period, the at least one tolerable time shift, the at least one start transmission time instant, and the at least one required resource amount (i.e., the transmission period, the tolerable time shift, the start transmission time instant, and the required resource amount of the MTC apparatus 151) corresponding to the second part.

Specifically, in some embodiments, for each of the MTC apparatuses included in the second part, the processor 113 temporarily decides at least one possible transmission time instant according to the start transmission time instant and the transmission period, decides a tolerable transmission interval according to the tolerable time shift, and selects a time instant that the required resource amount is available from the tolerable transmission interval as the transmission time instant. In some other embodiments, for each of the MTC apparatuses included in the second part, the processor 113 may temporarily decide at least one possible transmission time instant according to the start transmission time instant and the transmission period and then determine the required resource amount is available at each of the at least one possible transmission time instant. A possible transmission time instant that the required resource amount is available is the transmission time instant. For a possible time instant that the required resource amount is not available, the processor 113 decides a tolerable transmission interval according to the tolerable time shift and then selects a time instant that the required resource amount is available from the tolerable transmission interval as the transmission time instant. Now, a concrete example will be described with reference to FIG. 2. The processor 113 temporarily decides that the possible transmission time instant of the MTC apparatus 151 is the time instant 1 (i.e., the system time instant 5) within the second scheduling interval T2, determines that the required resource amount (e.g., the resource block F) of the MTC apparatus 151 is available at the possible transmission time instant, and then decides that the time instant 1 within the second scheduling interval T2 is the transmission time instant of the MTC apparatus 151.

In this embodiment, the first resource allocation result 20 comprises at least one first transmission time instant of each of the MTC apparatuses 131, 133, 135, 137, 139 included in the first part within the first scheduling interval T1. The transceiver 111 further transmits each of the at least one first transmission time instant to the corresponding MTC apparatus so that each of the MTC apparatuses 131, 133, 135, 137, 139 included in the first part transmits first data within the first scheduling interval T1 according to the corresponding at least one first transmission time instant. Moreover, the second resource allocation result 26 comprises at least one second transmission time instant of the MTC apparatus 151 included in the second part within the second scheduling interval T2. The transceiver 111 transmits each of the at least one second transmission time instant to the corresponding MTC apparatus so that the MTC apparatus 151 included in the second part transmits second data within the second scheduling interval T2 according to the corresponding at least one second transmission time instant.

Similar to the first embodiment, after having scheduled the wireless resources for the second scheduling interval T2, the processor 113 updates the start transmission time instants and the start scheduling time instants of the MTC apparatuses 131, 133, 135, 137, 139, 151. Additionally, the processor 113 takes the end-up scheduling time instant of the second scheduling interval T2 as the next start scheduling time instant (i.e., the system time instant 7 depicted in FIG. 2). The processor 113 determines that no MTC apparatus moves into or out of the LTE wireless network system 1 within the first scheduling interval T1 and the second scheduling interval T2. Based on this determination result, the processor 113 decides the next scheduling interval (not depicted) according to the updated start scheduling time instant and the first scheduling interval length L1 (which is still four time units) and schedules the wireless resources of the MTC apparatuses 131, 133, 135, 137, 139, 151 for this next scheduling interval.

It should be appreciated that according to the technology provided by this embodiment, if there is any MTC apparatus moving into or out of the LTE wireless network system 1 within any scheduling interval, the processor 113 may adopt various different mechanisms to allocate the resources for the next scheduling interval. For example, the processor 113 may adopt various mechanisms described in the first embodiment to allocate the resources for the next scheduling interval. According to the descriptions of the first embodiment and the second embodiment, people having ordinary skill in the art shall understand how the second embodiment executes the operations of the mechanisms based on the first embodiment, so this will not be further described herein. As another example, if there is any MTC apparatus moving into the LTE wireless network system 1 within any scheduling interval, the processor 113 may adopt the mechanism used in the second scheduling interval T2 of this embodiment to allocate resources for the MTC apparatus that newly moves in. In other words, the processor 113 treats the MTC apparatus that newly moves in as an MTC apparatus not allocated any resource in the previous scheduling interval and then allocates the resources for this MTC apparatus separately in the next scheduling interval.

According to the above descriptions, for the MTC apparatuses 131, 133, 135, 137, 139, 151 served by the LTE base station 11, the LTE base station 11 schedules the wireless resources in advance to obtain a first resource allocation result according to the transmission periods, the tolerable time shifts, the start transmission time instants, and the required resource amounts of the MTC apparatuses 131, 133, 135, 137, 139, 151. If this first resource allocation result indicates that one or more MTC apparatuses are not allocated any resource, the LTE base station 11 schedules the wireless resources in the next scheduling interval for the MTC apparatuses not allocated any resource. In this way, the LTE base station 11 can make sure that all the MTC apparatuses are allocated resources in advance. It is unnecessary for the MTC apparatuses 131, 133, 135, 137, 139, 151 to request resources from the LTE base station 11 via a contention-based random access procedure. Therefore, the shortcomings of the prior art are overcome.

Figure 3:
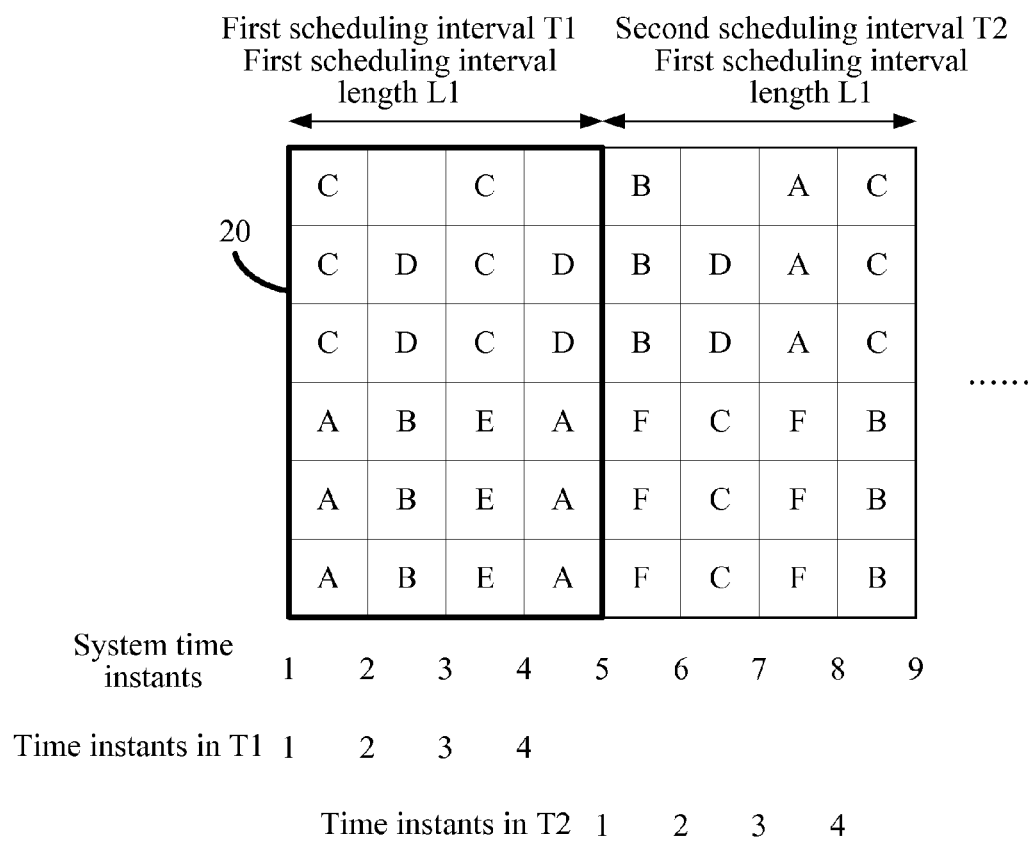
FIG. 3 depicts a resource allocation result of a third embodiment.

Please refer to FIGS. 1A-1C and FIG. 3 for a third embodiment of the present invention, wherein FIG. 3 depicts a resource allocation result in this embodiment. Most operations of the third embodiment are similar to those of the first embodiment. The differences between the two embodiments lie in the operations adopted by the LTE base station 11 when the first resource allocation result 20, which is the resource allocation result within the first scheduling interval T1 and is decided by the LTE base station 11 for the MTC apparatuses 131, 133, 135, 137, 139, 151, indicates that one or more MTC apparatuses are not allocated any resource. In the following descriptions, only the difference between this embodiment and the first embodiment will be detailed.

In this embodiment, the processor 113 determines that the first resource allocation result 20 indicates that the MTC apparatuses 131, 133, 135, 137, 139 included in a first part of the MTC apparatuses 131, 133, 135, 137, 139, 151 are all allocated resource and the MTC apparatus 151 included in a second part of the MTC apparatuses 131, 133, 135, 137, 139, 151 is not allocated any resource. Then, the processor 113 decides a second resource allocation result 30 in the next scheduling interval (i.e., the second scheduling interval T2) according to the first resource allocation result 20 as shown in FIG. 3.

Specifically, the processor 113 decides the second scheduling interval T2 (i.e., the interval form the system time instant 5 to the system time instant 9) according to an end-up scheduling time instant (i.e., the system time instant 5) of the first scheduling interval T1 and the first scheduling interval length L1. Afterwards, the processor 113 decides a scheduling sequence (not depicted), wherein this scheduling sequence indicates that the MTC apparatus 151 included in the second part has a priority over the MTC apparatuses 131, 133, 135, 137, 139 included in the first part. For example, the scheduling sequence may be: the MTC apparatuses 151, 131, 133, 135, 137, 139. Next, the processor 113 decides the second resource allocation result 30 of the MTC apparatuses 131, 133, 135, 137, 139, 151 in the second scheduling interval T2 according to this scheduling sequence and the transmission periods, the tolerable time shifts, the start transmission time instants, and the required resource amounts of the MTC apparatuses 131, 133, 135, 137, 139, 151 as shown in FIG. 3. According to the aforesaid descriptions for the first scheduling interval T1, people of ordinary skill in the art shall readily devise how the processor 113 allocates the wireless resources for the second scheduling interval T2, so this will not be further described herein.

In this embodiment, the first resource allocation result 20 comprises at least one first transmission time instant of each of the MTC apparatuses 131, 133, 135, 137, 139 included in the first part within the first scheduling interval T1. The transceiver 111 further transmits each of the at least one first transmission time instant to the corresponding MTC apparatus so that each of the MTC apparatuses 131, 133, 135, 137, 139 included in the first part transmits first data within the first scheduling interval T1 according to the corresponding at least one first transmission time instant. Moreover, the second resource allocation result 30 comprises at least one second transmission time instant of each of the MTC apparatuses 151, 131, 133, 135, 137 included in a third part of the MTC apparatuses 131, 133, 135, 137, 139 within the second scheduling interval T2. It should be appreciated that this third part comprises the MTC apparatus 151 of the second part. The transceiver 111 further transmits each of the at least one second transmission time instant to the corresponding MTC apparatus so that the MTC apparatuses 151, 131, 133, 135, 137 included in the third part transmit second data in the second scheduling interval T2 according to the corresponding at least one second transmission time instant.

Similar to the first embodiment, after having scheduled the wireless resources for the second scheduling interval T2, the processor 113 updates the start transmission time instants and the start scheduling time instants of the MTC apparatuses 131, 133, 135, 137, 139, 151. Additionally, the processor 113 takes the end-up scheduling time instant of the second scheduling interval T2 as the next start scheduling time instant (i.e., the system time instant 9 depicted in FIG. 3). The processor 113 determines that no MTC apparatus moves into or out of the LTE wireless network system 1 within the first scheduling interval T1 and the second scheduling interval T2. Based on this determination result, the processor 113 decides a next scheduling interval (not depicted) according to the updated start scheduling time instant and the first scheduling interval length L1 (which is still four time units) and allocates the wireless resources of the MTC apparatuses 131, 133, 135, 137, 139, 151 for this next scheduling interval.

It should be appreciated that according to the technology provided by this embodiment, if there is any MTC apparatus moving into or out of the LTE wireless network system 1 within any scheduling interval, the processor 113 may adopt various different mechanisms to allocate the resources for the next scheduling interval. For example, the processor 113 may adopt the various mechanisms described in the first embodiment to allocate the resources for the next scheduling interval. According to the descriptions in the first embodiment and the third embodiment, people of ordinary skill in the art shall understand how the third embodiment executes the operations of these mechanisms based on the first embodiment, so this will not be further described herein. As another example, if there is any MTC apparatus moving into the LTE wireless network system 1 within any scheduling interval, the processor 113 may adopt the mechanism used for the second scheduling interval T2 in the second embodiment to allocate resources for the MTC apparatus that newly moves in. In other words, the processor 113 treats the MTC apparatus that newly moves in as an MTC apparatus not allocated any resource in the previous scheduling interval and allocates the resources for this MTC apparatus separately in the next scheduling interval.

According to the above descriptions, for the MTC apparatuses 131, 133, 135, 137, 139, 151 served by the LTE base station 11, the LTE base station 11 schedules the wireless resources in advance to obtain a first resource allocation result according to the transmission periods, the tolerable time shifts, the start transmission time instants, and the required resource amounts of the MTC apparatuses 131, 133, 135, 137, 139, 151. If this first resource allocation result indicates that one or more MTC apparatuses are not allocated any resource, then the LTE base station 11 allocates the wireless resources in the next scheduling interval to MTC apparatuses that have not allocated any resource prior to allocating the wireless resources to MTC apparatuses that have been allocated resources. In this way, the LTE base station 11 can make sure that all the MTC apparatuses are allocated the resources in advance. Therefore, it is unnecessary for the MTC apparatuses 131, 133, 135, 137, 139, 151 to request resources from the LTE base station 11 via a contention-based random access procedure. In this way, shortcomings of the prior art are overcome.

Figure 4:
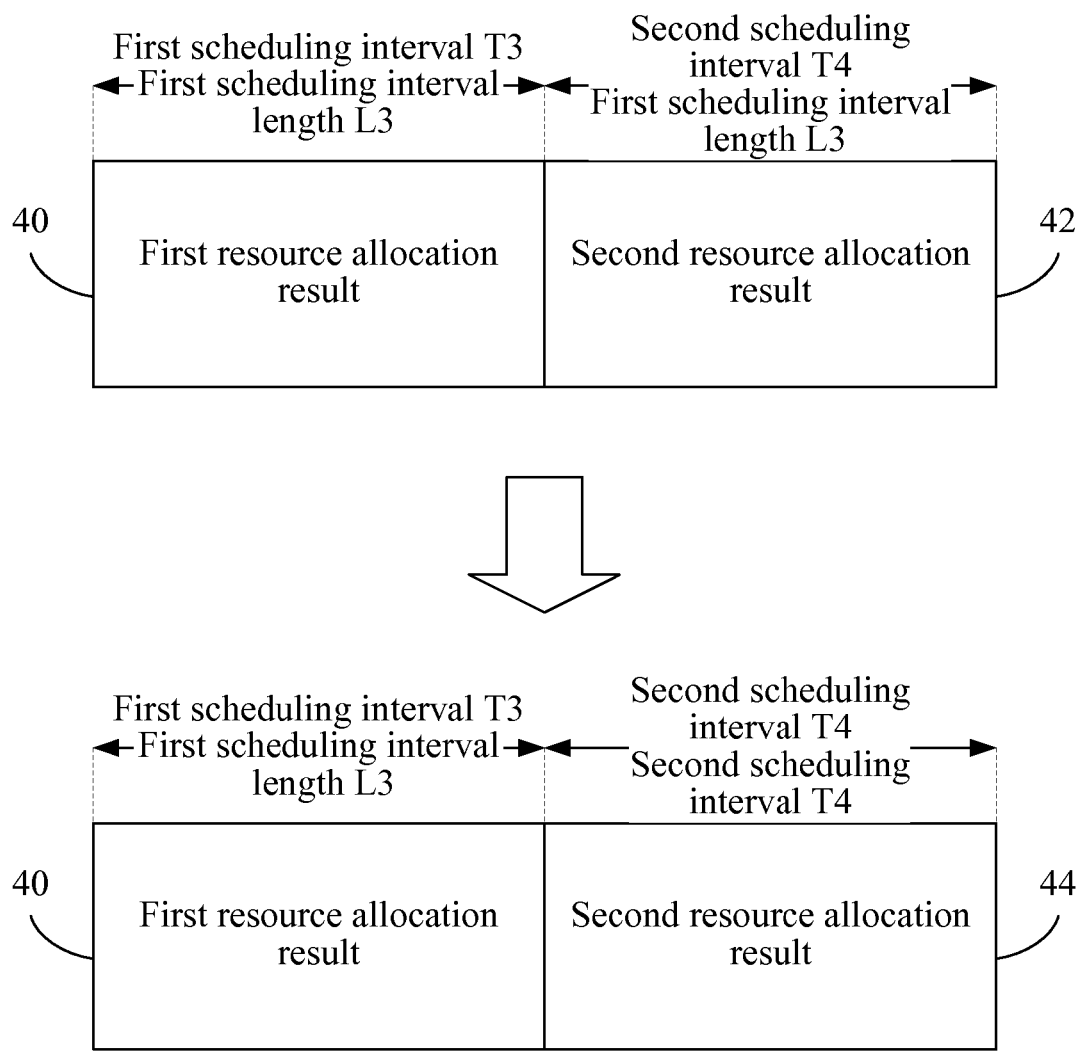
FIG. 4 depicts a resource allocation result of a fourth embodiment.

Please refer to FIGS. 1A-1B and FIG. 4 for a fourth embodiment of the present invention, wherein FIG. 4 depicts a resource allocation result of this embodiment. Most operations of the fourth embodiment are similar to those of the first embodiment. The differences between the fourth and the first embodiments lie in two aspects. In the first aspect, the difference is the first scheduling interval length L3, wherein the first scheduling interval length L3 is the least common multiple (i.e., twelve time units) of the transmission periods of the MTC apparatuses 131, 133, 135, 137, 139, 151 in this embodiment. In the second aspect, the difference is the operations adopted by the LTE base station 11 when a first resource allocation result 40, which is the resource allocation result within the first scheduling interval T1 and is decided by the LTE base station 11 for the MTC apparatuses 131, 133, 135, 137, 139, 151, indicates that one or more MTC apparatuses are not allocated any resource. In the following descriptions, only the differences between this embodiment and the first embodiment will be detailed.

In this embodiment, the processor 113 decides a first scheduling interval length L3 according to the transmission periods of the MTC apparatuses 131, 133, 135, 137, 139, 151. According to the above descriptions, the first scheduling interval length L3 is the least common multiple of the transmission periods of the MTC apparatuses 131, 133, 135, 137, 139, 151. Afterwards, the processor 113 decides a first scheduling interval T3 according to a start scheduling time instant and the first scheduling interval length L3 and decides the first resource allocation result 40 of the first scheduling interval T3 for the MTC apparatuses 131, 133, 135, 137, 139, 151 according to the transmission periods, the tolerable time shifts, the start transmission time instants, and the required resource amounts of the MTC apparatuses 131, 133, 135, 137, 139, 151. According to the aforesaid descriptions of the first embodiment to the third embodiment, people having ordinary skill in the art shall understand how this embodiment decides the first resource allocation result 40. Therefore, the details will not be further described herein.

Then, the processor 113 determines that the first resource allocation result 40 indicates that a first MTC apparatus among the MTC apparatuses 131, 133, 135, 137, 139, 151 is not allocated any resource and a second MTC apparatus among the MTC apparatuses 131, 133, 135, 137, 139, 151 is allocated resources at least twice. Based on this determination result, the processor 113 further decides a second resource allocation result 44 of a second scheduling interval T4 for the MTC apparatuses 131, 133, 135, 137, 139, 151 according to the first resource allocation result 40. Specifically, the processor 113 decides the second scheduling interval T4 according to an end-up scheduling time instant (not depicted) of the first scheduling interval T3 and the first scheduling interval length L3. The processor 113 further copies the first resource allocation result 40 as the second resource allocation result 42 of the second scheduling interval T4. Then, the processor 113 updates the second resource allocation result 42 into the second resource allocation result 44 by re-allocating one of the resources allocated to the second MTC apparatus in the second resource allocation result 42 to the first MTC apparatus. According to the descriptions of the first embodiment, people of ordinary skill in the art shall understand how the processor 113 re-allocates one of the resources allocated to the second MTC apparatus in the second resource allocation result 42 to the first MTC apparatus. Hence, the details will not be further described herein.

In this embodiment, the first resource allocation result 40 comprises at least one first transmission time instant of each of the at least one MTC apparatus (i.e., except for the first MTC apparatus which is not allocated any resource) included in a part of the MTC apparatuses 131, 133, 135, 137, 139, 151 within the first scheduling interval T3. The transceiver 111 transmits each of the at least one first transmission time instant to the corresponding MTC apparatus so that each of the at least one MTC apparatus included in the part transmits first data in the first scheduling interval T3 according to the corresponding at least one first transmission time instant. Furthermore, the second resource allocation result 44 comprises at least one second transmission time instant of each of the MTC apparatuses 131, 133, 135, 137, 139, 151 within the second scheduling interval T4. The transceiver 111 further transmits each of the at least one second transmission time instant to the corresponding MTC apparatus so that each of the MTC apparatuses transmits second data in the second scheduling interval T3 according to the corresponding at least one second transmission time instant. In this embodiment, if no MTC apparatus moves into or out of the LTE wireless network system 1 within the first scheduling interval T1 and the second scheduling interval T2, the processor 113 may directly copy the first resource allocation result 40 and the second resource allocation result 44 as the resource allocation results in other subsequent intervals.

It should be appreciated that according to the technology provided by this embodiment, if there is any MTC apparatus moving into or out of the LTE wireless network system 1 within any scheduling interval, the processor 113 may adopt various different mechanisms to allocate the resources for the next scheduling interval. For example, the processor 113 may adopt the various mechanisms described in the first embodiment to allocate the resources for the next scheduling interval. According to the descriptions of the first embodiment and the fourth embodiment, people of ordinary skill in the art shall understand how the fourth embodiment executes the operations of these mechanisms based on the first embodiment. Therefore, the details will not be further described herein. As another example, if there is any MTC apparatus moving into the LTE wireless network system 1 within any scheduling interval, the processor 113 may adopt the mechanism used for the second scheduling interval T2 in the second embodiment to allocate the resources for this MTC apparatus that newly moves in. In other words, the processor 113 treats the MTC apparatus that newly moves in as an MTC apparatus not allocated any resource in the previous scheduling interval and allocates resources for this MTC apparatus separately in the next scheduling interval.

According to the above descriptions, for the MTC apparatuses 131, 133, 135, 137, 139, 151 served by the LTE base station 11, the LTE base station 11 schedules the wireless resources in advance to obtain a resource allocation result according to the transmission periods, the tolerable time shifts, the start transmission time instants, and the required resource amounts of the MTC apparatuses 131, 133, 135, 137, 139, 151. The LTE base station 11 copies this resource allocation result as a resource allocation result of the next scheduling interval. If one or more MTC apparatuses are not allocated any resource in the previous scheduling interval, the LTE base station 11 updates the resource allocation result of the next scheduling interval through replacement. Subsequently, the LTE base station 11 may generate resource allocation results of other subsequent scheduling intervals through copying. In this way, the LTE base station 11 can make sure that all the MTC apparatuses are allocated resources in advance. Therefore, it is unnecessary for the MTC apparatuses 131, 133, 135, 137, 139, 151 to request resources from the LTE base station 11 via a contention-based random access procedure. Hence, the shortcomings of the prior art are overcome.

Figure 5:
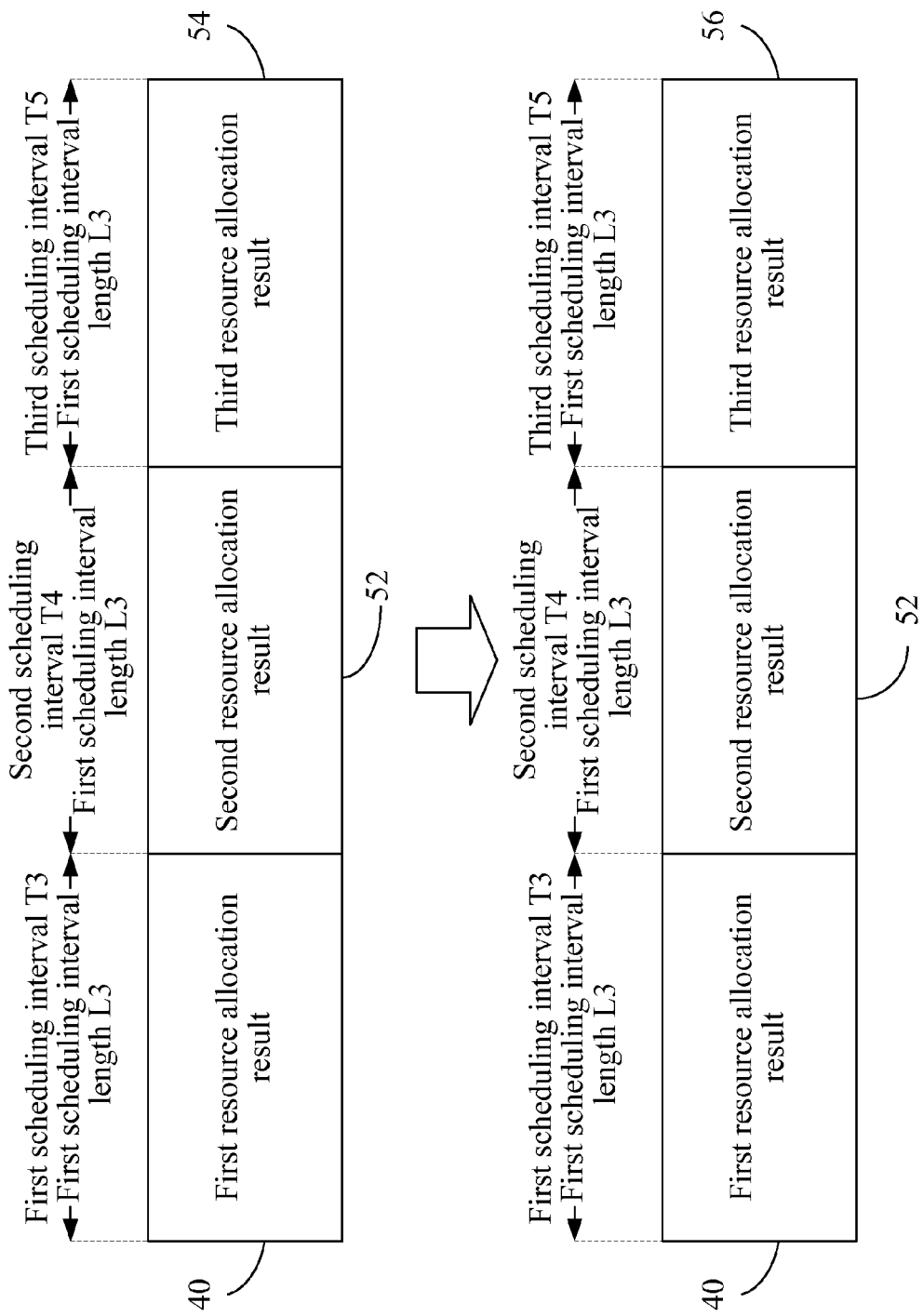
FIG. 5 depicts a resource allocation result of a fifth embodiment.

Please refer to FIGS. 1A, 1B, and FIG. 5 for a fifth embodiment of the present invention, wherein FIG. 5 depicts a resource allocation result of this embodiment. Most operations of the fifth embodiment are similar to those of the first embodiment. The differences between the two embodiments lie in two aspects. In the first aspect, the difference is the first scheduling interval length L3. In this embodiment, the first scheduling interval length L3 is the least common multiple (i.e., twelve time units) of the transmission periods of the MTC apparatuses 131, 133, 135, 137, 139, 151. In the second aspect, the difference is the operations adopted by the LTE base station 11 when the first resource allocation result 40, which is the resource allocation result within the first scheduling interval T1 and is decided by the LTE base station 11 for the MTC apparatuses 131, 133, 135, 137, 139, 151, indicates that one or more MTC apparatuses are not allocated any resource. In the following descriptions, only the differences between this embodiment and the first embodiment will be detailed.

In this embodiment, the processor 113 also decides the first scheduling interval length L3 according to the transmission periods of the MTC apparatuses 131, 133, 135, 137, 139, 151. As addressed in the above descriptions, the first scheduling interval length L3 is the least common multiple of the transmission periods of the MTC apparatuses 131, 133, 135, 137, 139, 151. Afterwards, the processor 113 decides a first scheduling interval T3 according to a start scheduling time instant and the first scheduling interval length L3. The processor 113 decides the first resource allocation result 40 of the first scheduling interval T3 for the MTC apparatuses 131, 133, 135, 137, 139, 151 according to the transmission periods, the tolerable time shifts, the start transmission time instants, and the required resource amounts of the MTC apparatuses 131, 133, 135, 137, 139, 151. According to the aforesaid descriptions of the first embodiment to the third embodiment, people of ordinary skill in the art shall understand how this embodiment decides the first resource allocation result 40. Therefore, the details will not be further described herein.

In this embodiment, the processor 113 further determines that the first resource allocation result 40 indicates that at least one MTC apparatus included in a first part of the MTC apparatuses 131, 133, 135, 137, 139, 151 are all allocated resource and a plurality of MTC apparatuses included in a second part of the MTC apparatuses 131, 133, 135, 137, 139, 151 are not allocated any resource. For ease of the following descriptions, it is assumed that the first part includes the MTC apparatuses 131, 133, 135, 137 and the second part includes the MTC apparatuses 139 and 151.

The processor 113 decides the second scheduling interval T4 according to an end-up scheduling time instant (not depicted) of the first scheduling interval T3 and the first scheduling interval length L3. Next, the processor 113 decides a second resource allocation result 52 of the second scheduling interval T4 for the MTC apparatuses 131, 133, 135, 137, 139, 151 according to a scheduling sequence and the transmission periods, the tolerable time shifts, the start transmission time instants, and the required resource amounts of the MTC apparatuses 131, 133, 135, 137, 139, 151. It should be appreciated that the scheduling sequence indicates that at least one MTC apparatus (e.g., the MTC apparatus 139 included in the second part) included in a first sub-part of the second part has a priority over the at least one MTC apparatus included in the first part and at least one MTC apparatus (e.g., the MTC apparatus 151 included in the second part) included in a second sub-part of the second part. According to the descriptions of the aforesaid third embodiment, people of ordinary skill in the art shall understand how this embodiment decides the second resource allocation result 52, so this will not be further described herein.

Additionally, the processor 113 decides the third scheduling interval T5 according to an end-up scheduling time instant (not depicted) of the second scheduling interval T4 and the first scheduling interval length L3. The processor 113 further determines that a specific MTC apparatus included in the first part (i.e., the MTC apparatuses 131, 133, 135, 137) is allocated resources at least twice. The processor 113 further copies the first resource allocation result 40 as a third resource allocation result 54 of the third scheduling interval T5 and further updates the third resource allocation result 54 into the third resource allocation result 56 by re-allocating one of the resources allocated to the specific MTC apparatus in the third resource allocation result 54 to the at least one MTC apparatus (e.g., the MTC apparatus 151 included in the second part) included in the second sub-part. According to the descriptions of the first embodiment and the fourth embodiment, people of ordinary skill in the art shall understand how this embodiment decides the third resource allocation result 56, so this will not be further described herein.

It should be appreciated that in other embodiments, the third resource allocation result 56 may correspond to the second scheduling interval T4 instead and the second resource allocation result 52 may correspond to the third scheduling interval T5 instead. In other words, in other embodiments, after having decided the first resource allocation result 40 of the first scheduling interval T3, the processor 113 may firstly decide the resource allocation result of the second scheduling interval T4 in the manner of copy-and-replacement, and then decides the resource allocation result of the third scheduling interval T5 through priority processing.

Similar to the first embodiment to the fourth embodiment, the first resource allocation result 40, the second resource allocation result 52, and the third resource allocation result 56 comprise at least one transmission time instant of each of the MTC apparatuses 131, 133, 135, 137, 139, 151 within the first scheduling interval T3, the second scheduling interval T4, and/or the third scheduling interval T5. The transceiver 111 transmits each of the at least one transmission time instant to the corresponding MTC apparatus so that each of the MTC apparatuses transmits data within the first scheduling interval T3, the second scheduling interval T4, and/or the third scheduling interval T5 according to the corresponding at least one transmission time instant.

In this embodiment, if no MTC apparatus moves into or out of the LTE wireless network system 1 within the first scheduling interval T3, the second scheduling interval T4, and the third scheduling interval T5, the processor 113 may directly copy the first resource allocation result 40, the second resource allocation result 52, and the third resource allocation result 56 as the resource allocation results in other subsequent scheduling intervals.

It should be appreciated that according to the technology provided by this embodiment, if there is any MTC apparatus moving into or out of the LTE wireless network system 1 within any scheduling interval, the processor 113 may adopt various different mechanisms to allocate the resources for the next scheduling interval. For example, the processor 113 may adopt the various mechanisms described in the first embodiment to allocate the resources for the next scheduling interval. According to the descriptions of the first embodiment and the fifth embodiment, people of ordinary skill in the art shall understand how the fifth embodiment executes the operations of these mechanisms based on the first embodiment, so this will not be further described herein. As another example, if there is any MTC apparatus moving into the LTE wireless network system 1 within any scheduling interval, the processor 113 may adopt the mechanism used for the second scheduling interval T2 in the second embodiment to allocate the resources for the MTC apparatus that newly moves in. In other words, the processor 113 treats the MTC apparatus that newly moves in as the MTC apparatus not allocated any resource in the previous scheduling interval, and allocates the resources to this MTC apparatus separately in the next scheduling interval.

Figure 6:
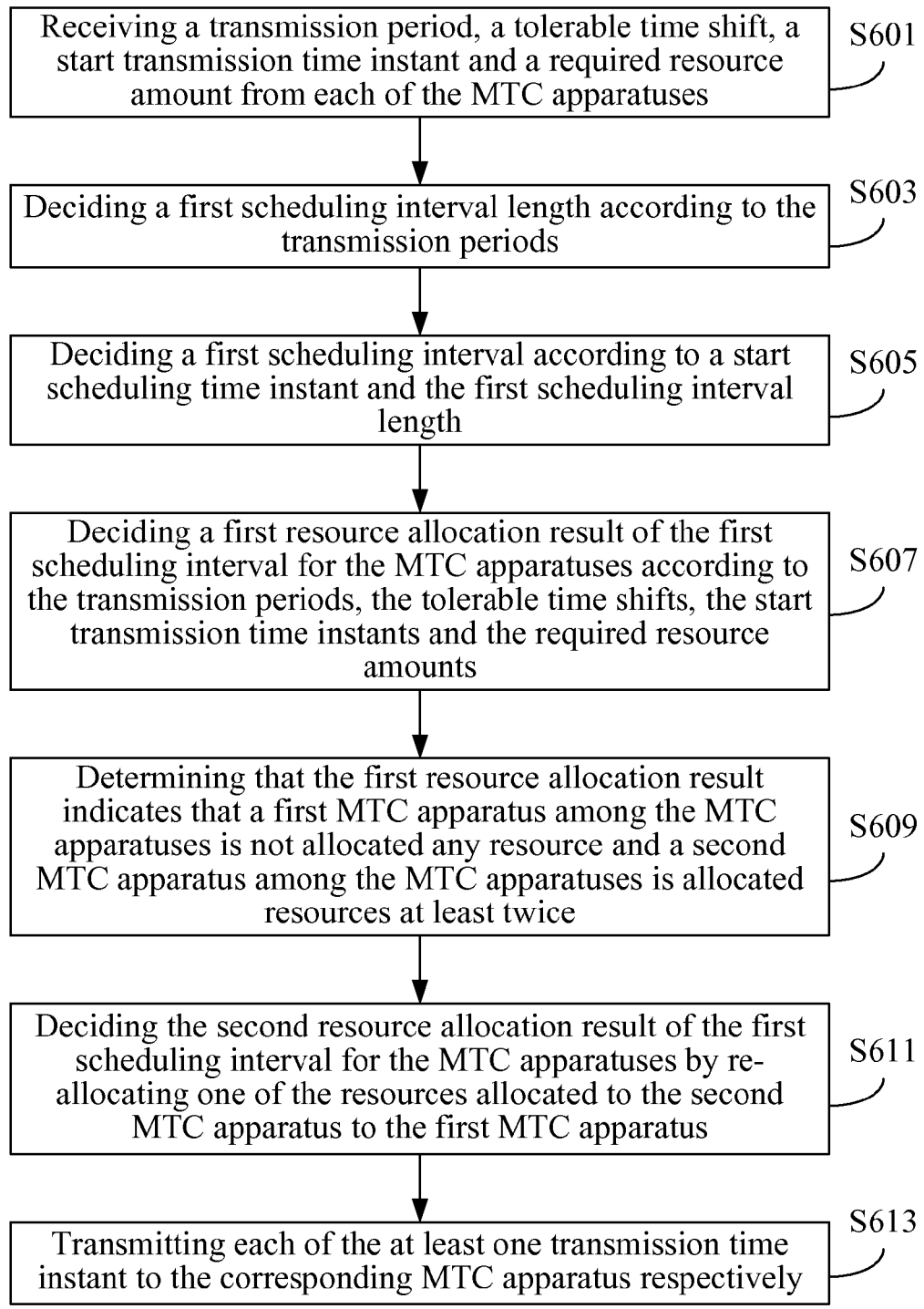
FIG. 6 depicts a flowchart diagram of a wireless resource scheduling method of a sixth embodiment.

A sixth embodiment of the present invention is a wireless resource scheduling method and a flowchart diagram of which is depicted in FIG. 6. This wireless resource scheduling method is for use in an LTE base station (e.g., the LTE base station 11 described above), wherein the LTE base station is wirelessly connected to a plurality of MTC apparatuses.

Firstly, the wireless resource scheduling method executes step S601 to receive a transmission period, a tolerable time shift, a start transmission time instant, and a required resource amount from each of the MTC apparatuses by the LTE base station. Next, step S603 is executed to decide a first scheduling interval length according to the transmission periods by the LTE base station. Afterwards, step S605 is executed to decide a first scheduling interval according to a start scheduling time instant and the first scheduling interval length by the LTE base station. Then, step S607 is executed to decide a first resource allocation result of the first scheduling interval for the MTC apparatuses according to the transmission periods, the tolerable time shifts, the start transmission time instants, and the required resource amounts by the LTE base station. It should be appreciated that when deciding the first resource allocation result for the MTC apparatuses in the step S607, resources may be allocated to the MTC apparatuses by following a processing order decided according to an ascending order of the start transmission time instants, lengths of the transmission periods, lengths of the tolerable time shifts, amounts of the required resource amounts, and/or priority levels arbitrarily assigned by the system.

Afterwards, in the wireless resource scheduling method, a second resource allocation result of the first scheduling interval is decided for the MTC apparatuses according to the first resource allocation result. Specifically, in the wireless resource scheduling method, step S609 is executed to determine that the first resource allocation result indicates that a first MTC apparatus among the MTC apparatuses is not allocated any resource and a second MTC apparatus among the MTC apparatuses is allocated resources at least twice by the LTE base station. Then, step S611 is executed to decide the second resource allocation result of the MTC apparatuses in the first scheduling interval by re-allocating one of the resources allocated to the second MTC apparatus to the first MTC apparatus by the LTE base station. The second resource allocation result comprises at least one transmission time instant of each of the MTC apparatuses within the first scheduling interval.

Next, step S613 is executed to transmit each of the at least one transmission time instant to the corresponding MTC apparatus by the LTE base station so that each of the MTC apparatuses transmits data within the first scheduling interval according to the corresponding at least one transmission time instant.

In addition to the aforementioned steps, the sixth embodiment can also execute all the operations, functions, and steps described in the first embodiment. How the sixth embodiment executes these operations, functions, and steps can be readily understood by those of ordinary skill in the art based on the first embodiment described above, so this will not be further described herein.

Figure 7:
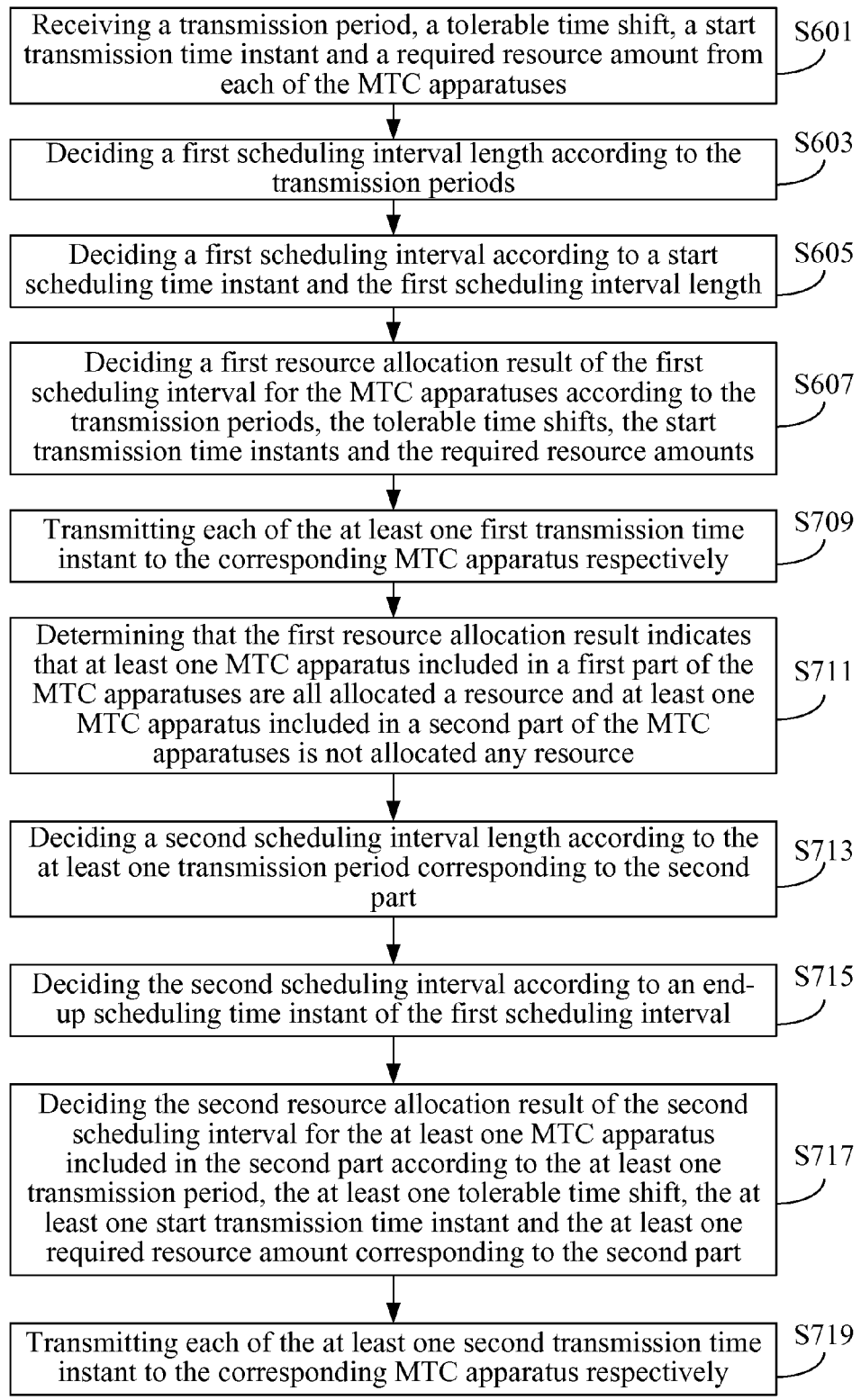
FIG. 7 depicts a flowchart diagram of a wireless resource scheduling method of a seventh embodiment.

A seventh embodiment of the present invention is a wireless resource scheduling method, wherein a flowchart diagram of which is depicted in FIG. 7. This wireless resource scheduling method is for use in an LTE base station (e.g., the LTE base station 11 described above) and the LTE base station is wirelessly connected to a plurality of MTC apparatuses. Most steps of the seventh embodiment are substantially similar to those of the sixth embodiment; hence, only differences between the two embodiments will be detailed hereinafter.

In the wireless resource scheduling method of this embodiment, the steps S601, S603, S605, and S607 are executed firstly to obtain a first resource allocation result of the first scheduling interval. The first resource allocation result comprises at least one first transmission time instant of each of the at least one MTC apparatus included in the first part within the first scheduling interval. Then, step S709 is executed to transmit each of the at least one first transmission time instant to the corresponding MTC apparatus by the LTE base station so that each of the at least one MTC apparatus included in the first part transmits first data in the first scheduling interval according to the corresponding at least one first transmission time instant.

Then, in the wireless resource scheduling method, a second resource allocation result of a second scheduling interval is decided according to the first resource allocation result. Specifically, in the wireless resource scheduling method, step S711 is executed to determine by the LTE base station that the first resource allocation result indicates that at least one MTC apparatus included in a first part of the MTC apparatuses are all allocated a resource and at least one MTC apparatus included in a second part of the MTC apparatuses is not allocated any resource. Next, step S713 is executed to decide a second scheduling interval length according to the at least one transmission period corresponding to the second part by the LTE base station. Then, step S715 is executed to decide the second scheduling interval according to an end-up scheduling time instant of the first scheduling interval by the LTE base station. Next, step S717 is executed to decide the second resource allocation result in the second scheduling interval for the at least one MTC apparatus included in the second part by the LTE base station according to the at least one transmission period, the at least one tolerable time shift, the at least one start transmission time instant, and the at least one required resource amount corresponding to the second part. The second resource allocation result comprises at least one second transmission time instant of each of the at least one MTC apparatus included in the second part within the second scheduling interval.

Then, step S719 is executed to transmit each of the at least one second transmission time instant to the corresponding MTC apparatus respectively by the LTE base station so that each of the at least one MTC apparatus included in the second part transmits second data in the second scheduling interval according to the corresponding at least one second transmission time instant.

In addition to the above steps, the seventh embodiment can also execute all the operations, functions, and steps described in the second embodiment. How the seventh embodiment executes these operations, functions, and steps can be readily understood by those of ordinary skill in the art based on the second embodiment, so this will not be further described herein.

Figure 8:
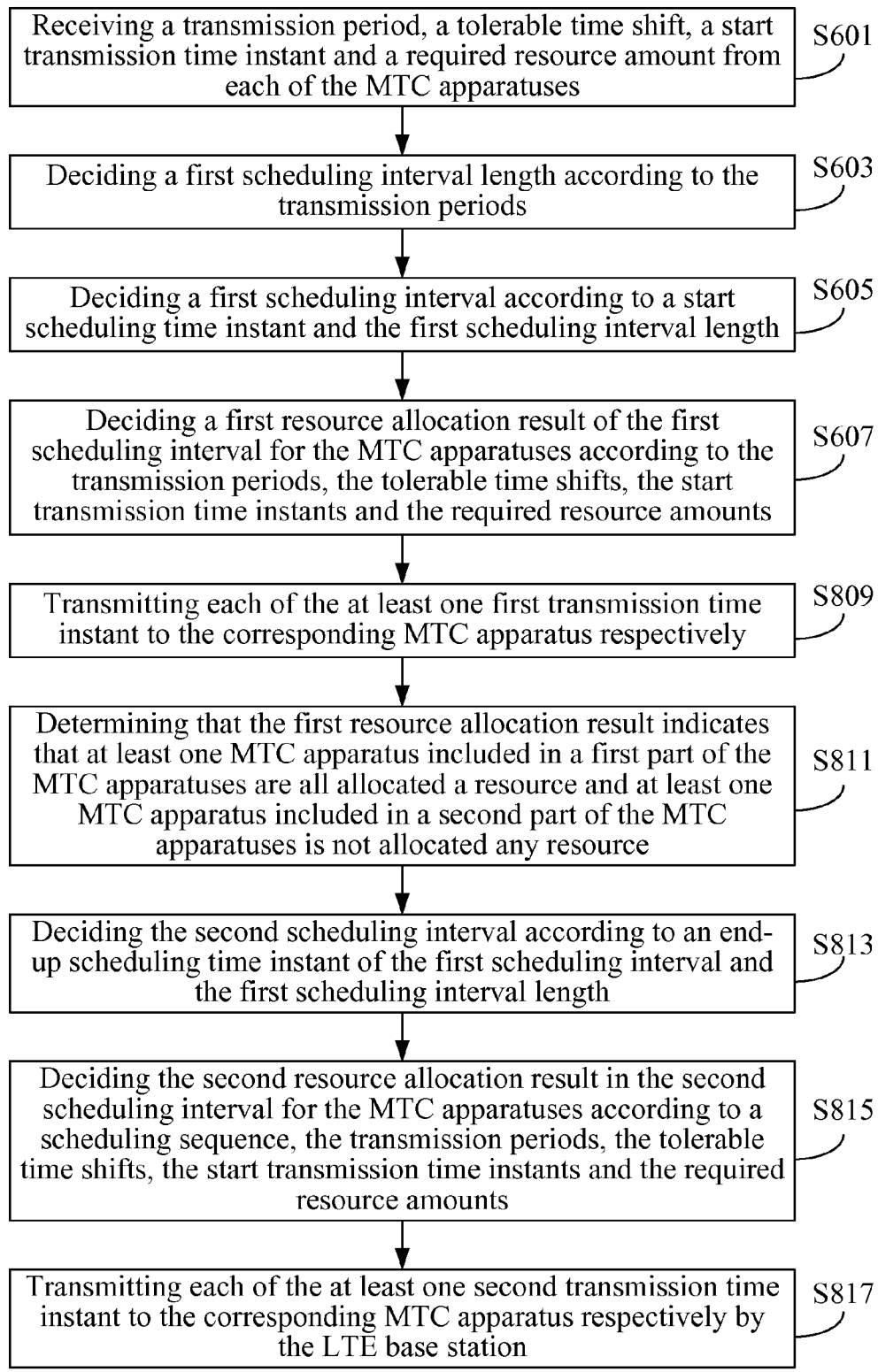
FIG. 8 depicts a flowchart diagram of a wireless resource scheduling method of an eighth embodiment.

An eighth embodiment of the present invention is a wireless resource scheduling method, wherein a flowchart diagram of which is depicted in FIG. 8. This wireless resource scheduling method is for use in an LTE base station (e.g., the LTE base station 11 described above). The LTE base station is wirelessly connected to a plurality of MTC apparatuses. The steps of the eighth embodiment are substantially similar to those of the sixth embodiment, so only the differences between the two embodiments will be detailed hereinafter.

In the wireless resource scheduling method of this embodiment, the steps S601, S603, S605, and S607 are executed firstly to obtain a first resource allocation result of the first scheduling interval. The first resource allocation result comprises at least one first transmission time instant of each of the at least one MTC apparatus included in the first part within the first scheduling interval. Then, step S809 is executed to transmit each of the at least one first transmission time instant to the corresponding MTC apparatus by the LTE base station so that each of the at least one MTC apparatus included in the first part transmits first data in the first scheduling interval according to the corresponding at least one first transmission time instant.

Afterwards, in the wireless resource scheduling method, step S811 is executed to determine by the LTE base station that the first resource allocation result indicates that at least one MTC apparatus included in a first part of the MTC apparatuses are all allocated resource and at least one MTC apparatus included in a second part of the MTC apparatuses is not allocated any resource. Then, step S813 is executed to decide the second scheduling interval according to an end-up scheduling time instant of the first scheduling interval and the first scheduling interval length by the LTE base station. Next, step S815 is executed to decide the second resource allocation result in the second scheduling interval for the MTC apparatuses according to a scheduling sequence, the transmission periods, the tolerable time shifts, the start transmission time instants, and the required resource amounts. It should be appreciated that, the scheduling sequence indicates that the at least one MTC apparatus included in the second part has a priority over the at least one MTC apparatus included in the first part.

The second resource allocation result decided in the step S815 comprises at least one second transmission time instant of each of at least one MTC apparatus included in a third part of the MTC apparatuses within the second scheduling interval, and the third part comprises the second part. Next, step S817 is executed to transmit each of the at least one second transmission time instant to the corresponding MTC apparatus by the LTE base station so that each of the at least one MTC apparatus included in the third part transmits second data in the second scheduling interval according to the corresponding at least one second transmission time instant.

In addition to the above steps, the eighth embodiment can also execute all the operations, functions, and steps described in the third embodiment. How the eighth embodiment executes these operations, functions, and steps can be readily understood by people of ordinary skill in the art based on the third embodiment described above, so this will not be further described herein.

Figure 9:
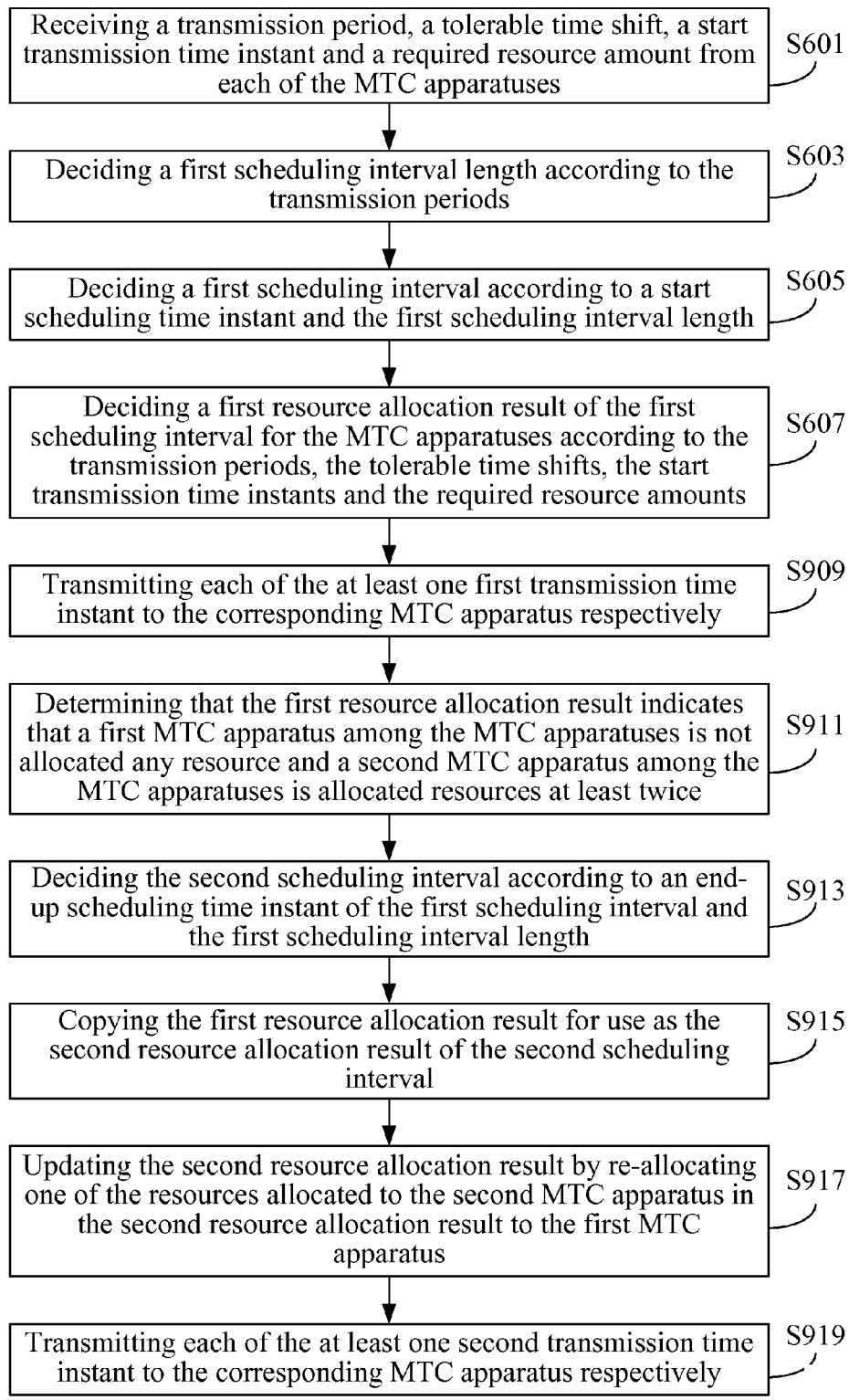
FIG. 9 depicts a flowchart diagram of a wireless resource scheduling method of a ninth embodiment.

A ninth embodiment of the present invention is a wireless resource scheduling method and a flowchart diagram of which is depicted in FIG. 9. This wireless resource scheduling method is for use in an LTE base station (e.g., the LTE base station 11 described above), and the LTE base station is wirelessly connected to a plurality of MTC apparatuses. The steps of the ninth embodiment are substantially similar to those of the sixth embodiment, so only differences between the two embodiments will be detailed hereinafter.

In the wireless resource scheduling method of this embodiment, the steps S601, S603, S605, and S607 are firstly executed to obtain a first resource allocation result in the first scheduling interval. The first resource allocation result comprises at least one first transmission time instant of each of the at least one MTC apparatus included in a part of the MTC apparatuses within the first scheduling interval. Then, step S909 is executed to transmit each of the at least one first transmission time instant to the corresponding MTC apparatus by the LTE base station so that each of the at least one MTC apparatus included in the part transmits first data in the first scheduling interval according to the corresponding at least one first transmission time instant.

Then, step S911 is executed to determine by the LTE base station that the first resource allocation result indicates that a first MTC apparatus among the MTC apparatuses is not allocated any resource and a second MTC apparatus among the MTC apparatuses is allocated resources at least twice. Next, step S913 is executed to decide the second scheduling interval according to an end-up scheduling time instant of the first scheduling interval and the first scheduling interval length by the LTE base station. Afterwards, step S915 is executed to copy the first resource allocation result for use as the second resource allocation result of the second scheduling interval by the LTE base station. Then, step S917 is executed to update the second resource allocation result by re-allocating one of the resources allocated to the second MTC apparatus in the second resource allocation result to the first MTC apparatus by the LTE base station.

The second resource allocation result updated in the step S917 comprises at least one second transmission time instant of each of the MTC apparatuses within the second scheduling interval. Then, step S919 is executed to transmit each of the at least one second transmission time instant to the corresponding MTC apparatus by the LTE base station so that each of the MTC apparatuses transmits second data in the second scheduling interval according to the corresponding at least one second transmission time instant.

In addition to the above steps, the ninth embodiment can also execute all the operations, functions, and steps described in the fourth embodiment. How the ninth embodiment executes these operations, functions, and steps can be readily understood by those of ordinary skill in the art based on the fourth embodiment, so this will not be further described herein.

Figure 10A:
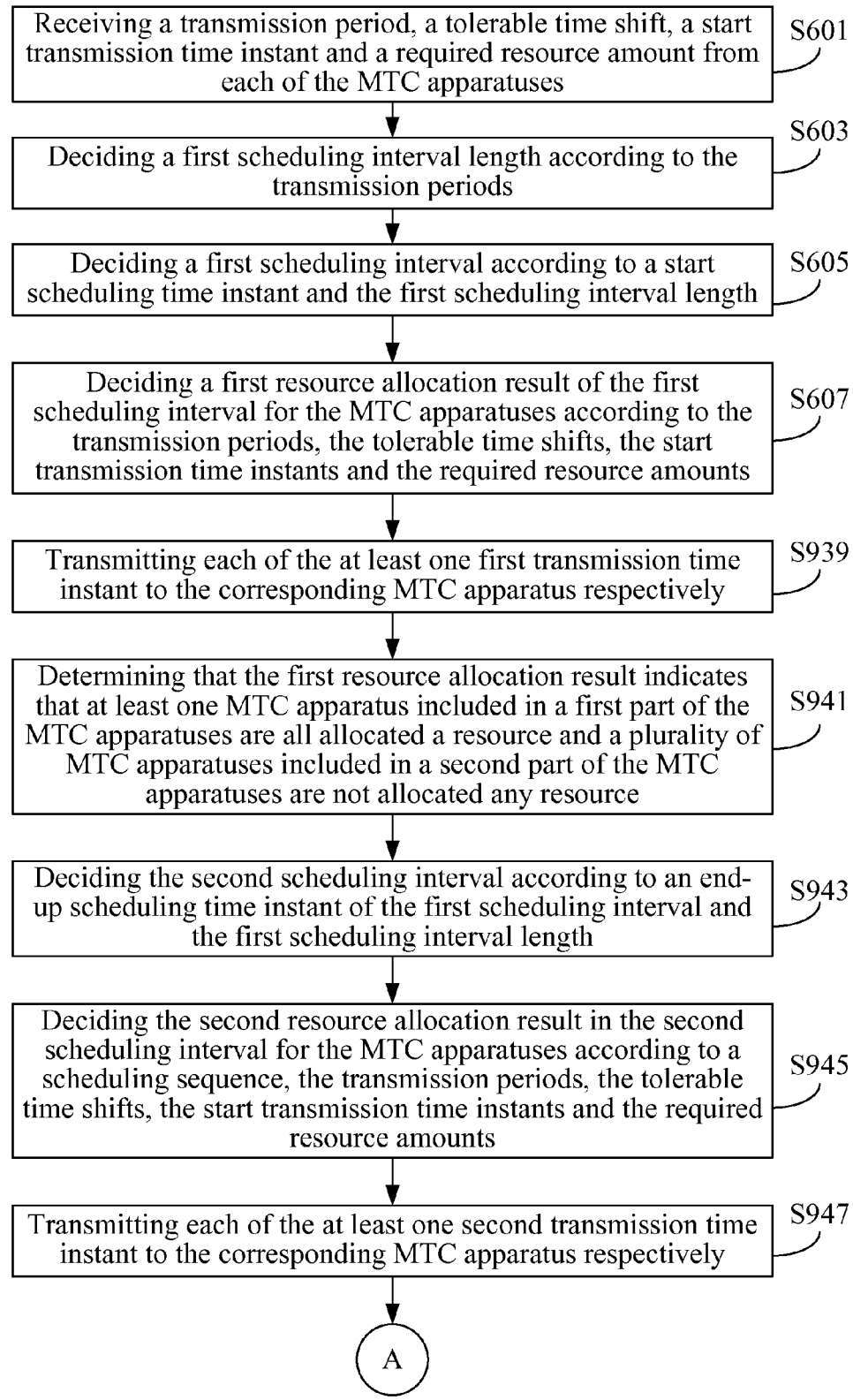
FIGS. 10A-10B depict a flowchart diagram of a wireless resource scheduling method of a tenth embodiment.
Figure 10B:
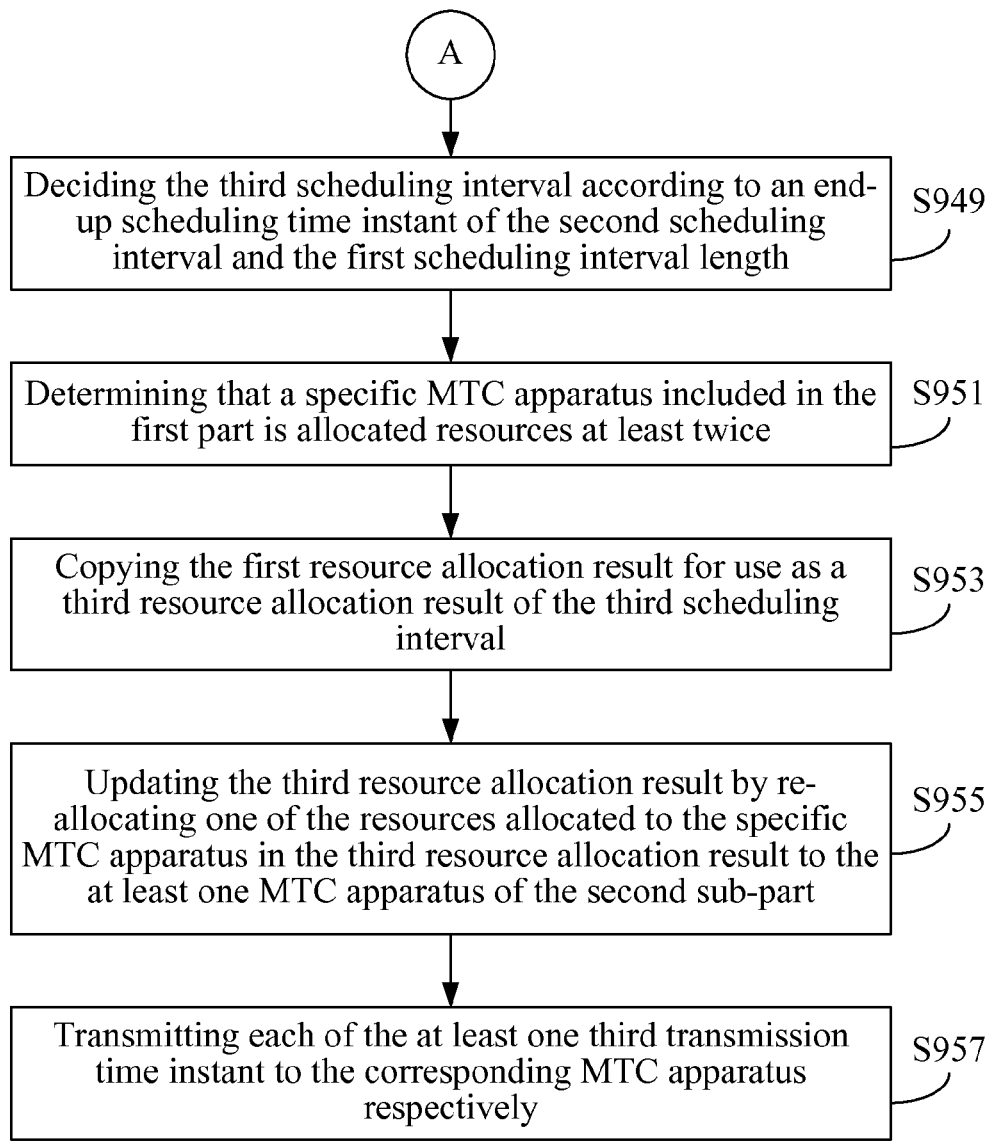

A tenth embodiment of the present invention is a wireless resource scheduling method and a flowchart diagram of which is depicted in FIG. 10A and FIG. 10B. This wireless resource scheduling method is for use in an LTE base station (e.g., the LTE base station 11 described above) and the LTE base station is wirelessly connected to a plurality of MTC apparatuses. The steps of the tenth embodiment are substantially similar to those of the sixth embodiment, so only differences between the two embodiments will be detailed hereinafter.

In the wireless resource scheduling method of this embodiment, the steps S601, S603, S605, and S607 are executed firstly to obtain a first resource allocation result in the first scheduling interval. The first resource allocation result comprises at least one first transmission time instant of each of the at least one MTC apparatus included in a part of the MTC apparatuses within the first scheduling interval. Then, step S939 is executed to transmit each of the at least one first transmission time instant to the corresponding MTC apparatus by the LTE base station so that each of the at least one MTC apparatus included in the part transmits first data in the first scheduling interval according to the corresponding at least one first transmission time instant.

Afterwards, in the wireless resource scheduling method, step S941 is executed to determine by the LTE base station that the first resource allocation result indicates that at least one MTC apparatus included in a first part of the MTC apparatuses are all allocated a resource and a plurality of MTC apparatuses included in a second part of the MTC apparatuses are not allocated any resource. Then, step S943 is executed to decide a second scheduling interval by the LTE base station. Specifically, the second scheduling interval may be decided according to an end-up scheduling time instant of the first scheduling interval and the first scheduling interval length in the step S943. Next, step S945 is executed to decide the second resource allocation result in the second scheduling interval for the MTC apparatuses by the LTE base station according to a scheduling sequence, the transmission periods, the tolerable time shifts, the start transmission time instants, and the required resource amounts. It should be appreciated that the scheduling sequence indicates that at least one MTC apparatus included in a first sub-part of the second part has a priority over the at least one MTC apparatus included in the first part and at least one MTC apparatus included in a second sub-part of the second part. The second resource allocation result comprises at least one second transmission time instant of each of the MTC apparatuses that are allocated resources at this stage within the second scheduling interval. Then, step S947 is executed to transmit each of the at least one second transmission time instant to the corresponding MTC apparatus by the LTE base station so as to transmit second data in the second scheduling interval according to the corresponding at least one second transmission time instant.

Next, step S949 is executed to decide a third scheduling interval by the LTE base station. Specifically, the third scheduling interval may be decided according to an end-up scheduling time instant of the second scheduling interval and the first scheduling interval length in the step S949. Afterwards, step S951 is executed to determine by the LTE base station that a specific MTC apparatus included in the first part is allocated resources at least twice. Then, step S953 is executed to copy the first resource allocation result for use as a third resource allocation result of the third scheduling interval by the LTE base station. Next, step S955 is executed to update the third resource allocation result by re-allocating one of the resources allocated to the specific MTC apparatus in the third resource allocation result to the at least one MTC apparatus included in the second sub-part by the LTE base station. The third resource allocation result comprises at least one third transmission time instant of each of the MTC apparatuses that are allocated resources at this stage within the third scheduling interval. Then, step S957 is executed to transmit each of the at least one third transmission time instant to the corresponding MTC apparatus by the LTE base station so that each of the MTC apparatuses transmits third data within the third scheduling interval according to the corresponding at least one third transmission time instant.

In addition to the above steps, the tenth embodiment can also execute all the operations, functions, and steps described in the fifth embodiment. How the tenth embodiment executes these operations, functions, and steps can be readily understood by those of ordinary skill in the art based on the fifth embodiment described above, so this will not be further described herein.

From the above descriptions of the embodiments, for a plurality of MTC apparatuses served by an LTE base station, the present invention decides a first resource allocation result of the first scheduling interval for the MTC apparatuses in advance according to the transmission periods, the tolerable time shifts, the start transmission time instants, and the required resource amounts of the MTC apparatuses. Since the first resource allocation result may indicate that some MTC apparatuses are not allocated any resource, the present invention may further decide a second resource allocation result of one of the first scheduling interval and a second scheduling interval for the MTC apparatuses according to the first resource allocation result. Moreover, the present invention may further decide a third resource allocation result of a third scheduling interval. Afterwards, the MTC apparatuses transmit data according to the first resource allocation result and/or the second resource allocation result or even the third resource allocation result. Since the present invention schedules the wireless resources for the MTC apparatuses in advance, it is unnecessary for the MTC apparatuses to request resources from the LTE base station via a contention-based random access procedure, thus overcoming the shortcomings of the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A Long Term Evolution (LTE) base station, comprising:
  a transceiver, being wirelessly connected to a plurality of Machine Type Communication (MTC) apparatuses and configured to receive a transmission period, a tolerable time shift, a start transmission time instant, and a required resource amount from each of the MTC apparatuses; and
  a processor, being electrically connected to the transceiver and configured to decide a first scheduling interval length according to the transmission periods, decide a first scheduling interval according to a start scheduling time instant and the first scheduling interval length, decide a first resource allocation result of the first scheduling interval for the MTC apparatuses according to the transmission periods, the tolerable time shifts, the start transmission time instants, and the required resource amounts, and decide a second resource allocation result of one of the first scheduling interval and a second scheduling interval for the MTC apparatuses according to the first resource allocation result,
  wherein the first resource allocation result comprises at least one first transmission time instant, each of the at least one first transmission time instant corresponds to one of the MTC apparatuses, the second resource allocation result comprises at least one second transmission time instant, each of the at least one second transmission time instant corresponds to one of the MTC apparatuses,
  wherein the transceiver further transmits each of the at least one first transmission time instant to the corresponding MTC apparatus and transmits each of the at least one second transmission time instant to the corresponding MTC apparatus.

2. The LTE base station of claim 1, wherein the processor further determines that the first resource allocation result indicates that a first MTC apparatus among the MTC apparatuses is not allocated any resource and a second MTC apparatus among the MTC apparatuses is allocated resources at least twice, and the second resource allocation result is decided by the processor by re-allocating one of the resources allocated to the second MTC apparatus to the first MTC apparatus.

3. The LTE base station of claim 2, wherein the at least one second transmission time instant is within the first scheduling interval, each of the MTC apparatuses corresponds to at least one of the at least one second transmission time instant, wherein each of the MTC apparatuses transmits data within the first scheduling interval according to the corresponding at least one second transmission time instant.

4. The LTE base station of claim 1, wherein the processor further determines that the first resource allocation result indicates that at least one MTC apparatus included in a first part of the MTC apparatuses are all allocated a resource and at least one MTC apparatus included in a second part of the MTC apparatuses is not allocated any resource, the processor decides a second scheduling interval length according to the at least one transmission period corresponding to the second part, the processor decides the second scheduling interval according to an end-up scheduling time instant of the first scheduling interval, and the processor decides the second resource allocation result of the second scheduling interval for the at least one MTC apparatus included in the second part according to the at least one transmission period, the at least one tolerable time shift, the at least one start transmission time instant, and the at least one required resource amount corresponding to the second part.

5. The LTE base station of claim 4, wherein the at least one first transmission time instant is within the first scheduling interval, the at least one second transmission time instant is within the second scheduling interval, each of the at least one MTC apparatus included in the first part corresponds to at least one of the at least one first transmission time instant, wherein each of the at least one MTC apparatus included in the first part transmits first data in the first scheduling interval according to the corresponding at least one first transmission time instant, each of the at least one MTC apparatus included in the second part corresponds to at least one of the at least one second transmission time instant, wherein each of the at least one MTC apparatus included in the second part transmits second data in the second scheduling interval according to the corresponding at least one second transmission time instant.

6. The LTE base station of claim 1, wherein the processor further determines that the first resource allocation result indicates that at least one MTC apparatus included in a first part of the MTC apparatuses are all allocated a resource and at least one MTC apparatus included in a second part of the MTC apparatuses is not allocated any resource, the processor decides the second scheduling interval according to an end-up scheduling time instant of the first scheduling interval and the first scheduling interval length, and the processor decides the second resource allocation result in the second scheduling interval for the MTC apparatuses according to a scheduling sequence, the transmission periods, the tolerable time shifts, the start transmission time instants, and the required resource amounts, wherein the scheduling sequence indicates that the at least one MTC apparatus included in the second part has a priority over the at least one MTC apparatus included in the first part.

7. The LTE base station of claim 6, wherein the at least one first transmission time instant is within the first scheduling interval, the at least one second transmission time instant is within the second scheduling interval, each of the at least one MTC apparatus included in the first part corresponds to at least one of the at least one first transmission time instant, wherein each of the at least one MTC apparatus included in the first part transmits first data in the first scheduling interval according to the corresponding at least one first transmission time instant, each of at least one MTC apparatus included in a third part of the MTC apparatuses corresponds to at least one of the at least one second transmission time instant, wherein each of the at least one MTC apparatus included in the third part transmits second data in the second scheduling interval according to the corresponding at least one second transmission time instant, and wherein the third part comprises the second part.

8. The LTE base station of claim 1, wherein the processor further determines that the first resource allocation result indicates that a first MTC apparatus among the MTC apparatuses is not allocated any resource and a second MTC apparatus among the MTC apparatuses is allocated resources at least twice, the processor further decides the second scheduling interval according to an end-up scheduling time instant of the first scheduling interval and the first scheduling interval length, the processor further copies the first resource allocation result as the second resource allocation result of the second scheduling interval, and the processor further updates the second resource allocation result by re-allocating one of the resources allocated to the second MTC apparatus in the second resource allocation result to the first MTC apparatus.

9. The LTE base station of claim 8, wherein the at least one first transmission time instant is within the first scheduling interval, the at least one second time instant is within the second scheduling interval, each of at least one MTC apparatus included in a part of the MTC apparatuses corresponds to at least one of the at least one first transmission time instant, wherein each of the at least one MTC apparatus included in the part transmits first data in the first scheduling interval according to the corresponding at least one first transmission time instant, each of the MTC apparatuses corresponds to at least one of the at least one second transmission time instant, wherein each of the MTC apparatuses transmits second data in the second scheduling interval according to the corresponding at least one second transmission time instant.

10. The LTE base station of claim 1, wherein the processor further determines that the first resource allocation result indicates that at least one MTC apparatus included in a first part of the MTC apparatuses are all allocated a resource and a plurality of MTC apparatuses included in a second part of the MTC apparatuses are not allocated any resource, the processor further decides the second scheduling interval and a third scheduling interval, and the processor decides the second resource allocation result of the MTC apparatuses in the second scheduling interval according to a scheduling sequence, the transmission periods, the tolerable time shifts, the start transmission time instants, and the required resource amounts, wherein the scheduling sequence indicates that at least one MTC apparatus included in a first sub-part of the second part has a priority over the at least one MTC apparatus included in the first part and at least one MTC apparatus included in a second sub-part of the second part, and the processor further determines that a specific MTC apparatus included in the first part is allocated resources at least twice, the processor further copies the first resource allocation result as a third resource allocation result of the third scheduling interval, and the processor further updates the third resource allocation result by re-allocating one of the resources allocated to the specific MTC apparatus in the third resource allocation result to the at least one MTC apparatus included in the second sub-part.

11. A wireless resource scheduling method for use in an LTE base station, the LTE base station being wirelessly connected to a plurality of MTC apparatuses, the wireless resource scheduling method comprising the steps of:
(a) receiving a transmission period, a tolerable time shift, a start transmission time instant, and a required resource amount from each of the MTC apparatuses;
(b) deciding a first scheduling interval length according to the transmission periods;
(c) deciding a first scheduling interval according to a start scheduling time instant and the first scheduling interval length;
(d) deciding a first resource allocation result of the first scheduling interval for the MTC apparatuses according to the transmission periods, the tolerable time shifts, the start transmission time instants, and the required resource amounts, wherein the first resource allocation result comprises at least one first transmission time instant and each of the at least one first transmission time instant corresponds to one of the MTC apparatuses;

(e) deciding a second resource allocation result of one of the first scheduling interval and a second scheduling interval for the MTC apparatuses according to the first resource allocation result, wherein the second resource allocation result comprises at least one second transmission time instant and each of the at least one second transmission time instant corresponds to one of the MTC apparatuses;

(f) transmitting each of the at least one first transmission time instant to the corresponding MTC apparatus; and (g) transmitting each of the at least one second transmission time instant to the corresponding MTC apparatus.

12. The wireless resource scheduling method of claim 11, further comprising:
determining that the first resource allocation result indicates that a first MTC apparatus among the MTC apparatuses is not allocated any resource and a second MTC apparatus among the MTC apparatuses is allocated resources at least twice,
wherein the step (e) is to decide the second resource allocation result by re-allocating one of the resources allocated to the second MTC apparatus to the first MTC apparatus.

13. The wireless resource scheduling method of claim 12, wherein the at least one second transmission time instant is within the first scheduling interval and each of the MTC apparatuses corresponds to at least one of the at least second transmission time instant, wherein each of the MTC apparatuses transmits data within the first scheduling interval according to the corresponding at least one second transmission time instant.

14. The wireless resource scheduling method of claim 11, further comprising:
determining that the first resource allocation result indicates that at least one MTC apparatus included in a first part of the MTC apparatuses are all allocated a resource and at least one MTC apparatus included in a second part of the MTC apparatuses is not allocated any resource; and
deciding a second scheduling interval length according to the at least one transmission period corresponding to the second part; and
deciding the second scheduling interval according to an end-up scheduling time instant of the first scheduling interval;
wherein the step (e) decides the second resource allocation result in the second scheduling interval for the at least one MTC apparatus included in the second part according to the at least one transmission period, the at least one tolerable time shift, the at least one start transmission time instant, and the at least one required resource amount corresponding to the second part.

15. The wireless resource scheduling method of claim 14, wherein the at least one first transmission time instant is within the first scheduling interval, the at least one second transmission time instant is within the second scheduling interval, each of the at least one MTC apparatus included in the first part corresponds to at least one of the at least one first transmission time instant, each of the at least one MTC apparatus included in the second part corresponds to at least one of the at least one second transmission time instant, wherein each of the at least one MTC apparatus included in the first part transmits first data in the first scheduling interval according to the corresponding at least one first transmission time instant and each of the at least one MTC apparatus included in the second part transmits second data in the second scheduling interval according to the corresponding at least one second transmission time instant.

16. The wireless resource scheduling method of claim 11, further comprising:
determining that the first resource allocation result indicates that at least one MTC apparatus included in a first part of the MTC apparatuses are all allocated a resource and at least one MTC apparatus included in a second part of the MTC apparatuses is not allocated any resource; and
deciding the second scheduling interval according to an end-up scheduling time instant of the first scheduling interval and the first scheduling interval length,
wherein the step (e) decides the second resource allocation result in the second scheduling interval for the MTC apparatuses according to a scheduling sequence, the transmission periods, the tolerable time shifts, the start transmission time instants, and the required resource amounts, and
wherein the scheduling sequence indicates that the at least one MTC apparatus included in the second part has a priority over the at least one MTC apparatus included in the first part.

17. The wireless resource scheduling method of claim 16, wherein the at least one first transmission time instant is within the first scheduling interval, the at least one second transmission time instant is within the second scheduling interval, each of the at least one MTC apparatus included in the first part corresponds to at least one of the at least one first transmission time instant, each of at least one MTC apparatus included in a third part of the MTC apparatuses corresponds to at least one of the at least one second transmission time instant, wherein each of the at least one MTC apparatus included in the first part transmits first data in the first scheduling interval according to the corresponding at least one first transmission time instant and each of the at least one MTC apparatus included in the third part transmits second data in the second scheduling interval according to the corresponding at least one second transmission time instant, and wherein the third part comprises the second part.

18. The wireless resource scheduling method of claim 11, further comprising:
determining that the first resource allocation result indicates that a first MTC apparatus among the MTC apparatuses is not allocated any resource and a second MTC apparatus among the MTC apparatuses is allocated resources at least twice; and
deciding the second scheduling interval according to an end-up scheduling time instant of the first scheduling interval and the first scheduling interval length,
wherein the step (e) comprises:
copying the first resource allocation result as the second resource allocation result of the second scheduling interval; and
updating the second resource allocation result by re-allocating one of the resources allocated to the second MTC apparatus in the second resource allocation result to the first MTC apparatus.

19. The wireless resource scheduling method of claim 18, wherein the at least one first time instant is within the first scheduling interval, the at least one second transmission time instant is within the second scheduling interval, each of at least one MTC apparatus included in a part of the MTC apparatuses corresponds to at least one of the at least one first transmission time instant, each of the MTC apparatuses corresponds to at least one of the at least one second transmission time instant, wherein each of the at least one MTC apparatus included in the part transmits first data in the first scheduling interval according to the corresponding at least one first transmission time instant and each of the MTC apparatuses transmits second data in the second scheduling interval according to the corresponding at least one second transmission time instant.

20. The wireless resource scheduling method of claim 11, further comprising:
  determining that the first resource allocation result indicates that at least one MTC apparatus included in a first part of the MTC apparatuses are all allocated a resource and a plurality of MTC apparatuses included in a second part of the MTC apparatuses are not allocated any resource;
  deciding the second scheduling interval;
  deciding the second resource allocation result of the MTC apparatuses in the second scheduling interval according to a scheduling sequence, the transmission periods, the tolerable time shifts, the start transmission time instants and the required resource amounts, wherein the scheduling sequence indicates that at least one MTC apparatus included in a first sub-part of the second part has a priority over the at least one MTC apparatus included in the first part and at least one MTC apparatus included in a second sub-part of the second part;
  deciding a third scheduling interval;
  determining that a specific MTC apparatus included in the first part is allocated resources at least twice;
  copying the first resource allocation result as a third resource allocation result of the third scheduling interval; and
  updating the third resource allocation result by re-allocating one of the resources allocated to the specific MTC apparatus in the third resource allocation result to the at least one MTC apparatus included in the second sub-part.

* * * * *